United States Patent
Kuratani et al.

(10) Patent No.: US 9,026,340 B2
(45) Date of Patent: May 5, 2015

(54) AIR-FUEL RATIO CONTROL SYSTEM AND AIR-FUEL RATIO CONTROL METHOD OF INTERNAL COMBUSTION ENGINE

(75) Inventors: Shinichi Kuratani, Kobe (JP); Tsuyoshi Takeuchi, Kobe (JP); Kozo Suzuki, Kobe (JP); Takashi Abe, Akashi (JP); Yoshinobu Mori, Kobe (JP); Daisuke Yanase, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 316 days.

(21) Appl. No.: 13/336,982

(22) Filed: Dec. 23, 2011

(65) Prior Publication Data
US 2012/0166068 A1  Jun. 28, 2012

(30) Foreign Application Priority Data
Dec. 24, 2010  (JP) ................... 2010-288532

(51) Int. Cl.
*B60T 7/12* (2006.01)
*G05D 1/00* (2006.01)
(Continued)

(52) U.S. Cl.
CPC ............ *F02D 41/149* (2013.01); *F01N 3/30* (2013.01); *F02D 41/1498* (2013.01); *F02D 41/2441* (2013.01); *F02D 41/2454* (2013.01); *F02D 41/248* (2013.01); *Y02T 10/20* (2013.01)

(58) Field of Classification Search
CPC ............ F02D 41/2467; F02D 41/0002; F02D 41/1405; F02D 41/14; F02D 41/16; F02D 41/1454; F02D 41/1438; F02D 41/1475; F02D 41/1486; F02D 41/1491; F02D 41/2461; F02D 41/2422; F02D 41/2445; F02D 41/2454; F02D 41/1456; F02D 41/144; F02D 41/10; F02D 41/107; F02D 41/108; F02D 41/149

USPC .......... 701/104, 103, 110, 114; 123/703, 704, 123/445, 446, 491, 493, 674, 675
See application file for complete search history.

(56) References Cited

U.S. PATENT DOCUMENTS 4,271,804 A * 6/1981 Bianchi et al. ................ 123/674
4,306,529 A * 12/1981 Chiesa et al. ................. 123/674
(Continued)

FOREIGN PATENT DOCUMENTS

EP  0265078 A2  4/1988
GB  2439566 A   1/2008
(Continued)

OTHER PUBLICATIONS

"PID Controller", Jan. 30, 2014, Wikipedia, http://en.wikipedia.org/wiki/PID_controller.*

(Continued)

*Primary Examiner* — Stephen K Cronin
*Assistant Examiner* — Brian Kirby
(74) *Attorney, Agent, or Firm* — Alleman Hall McCoy Russell & Tuttle LLP

(57) ABSTRACT

An air-fuel ratio control system of an internal combustion engine comprises a fuel amount determiner for determining a fuel command value. The fuel amount determiner has a feedback control mode in which the fuel amount determiner determines a running state reference coefficient corresponding to a running state detected by a running state detector based on a first correspondence stored in the memory, determines a running state compensation coefficient corresponding to the running state detected by the running state detector based on a second correspondence stored in the memory, determines a feedback compensation coefficient used to cause an air-fuel ratio to reach a value closer to a theoretical air-fuel ratio based on an output of the air-fuel ratio sensor, and determines the fuel command value using a formula including the determined running state reference coefficient, the determined running state compensation coefficient, and the determined feedback compensation coefficient.

12 Claims, 15 Drawing Sheets

(51) Int. Cl.
  *F02D 41/14* (2006.01)
  *F01N 3/30* (2006.01)
  *F02D 41/24* (2006.01)

(56) References Cited

U.S. PATENT DOCUMENTS

| | | | | |
|---|---|---|---|---|
| 4,388,906 | A * | 6/1983 | Sugiyama et al. | 123/492 |
| 4,392,471 | A * | 7/1983 | Miyagi et al. | 123/683 |
| 4,445,481 | A * | 5/1984 | Aoki et al. | 123/674 |
| 4,481,928 | A * | 11/1984 | Takimoto et al. | 123/492 |
| 4,498,445 | A * | 2/1985 | Hasegawa et al. | 123/674 |
| 4,509,489 | A * | 4/1985 | Hasegawa et al. | 123/680 |
| 4,517,948 | A | 5/1985 | Kaji et al. | |
| 4,530,333 | A * | 7/1985 | Nishimura | 123/674 |
| 4,535,736 | A * | 8/1985 | Taura et al. | 123/344 |
| 4,589,390 | A * | 5/1986 | Wazaki et al. | 123/680 |
| 4,615,319 | A * | 10/1986 | Tomisawa | 123/675 |
| 4,669,439 | A * | 6/1987 | Mamiya et al. | 123/674 |
| 4,729,361 | A * | 3/1988 | Otobe et al. | 123/486 |
| 4,748,956 | A * | 6/1988 | Iwaki | 123/675 |
| 4,759,329 | A * | 7/1988 | Nobuo et al. | 123/399 |
| 4,763,629 | A * | 8/1988 | Okazaki et al. | 123/683 |
| 4,800,857 | A * | 1/1989 | Tomisawa | 123/674 |
| 4,837,698 | A * | 6/1989 | Amano et al. | 701/110 |
| 4,844,041 | A * | 7/1989 | Ave et al. | 123/674 |
| 4,889,099 | A * | 12/1989 | Tomishawa | 123/674 |
| 4,934,328 | A * | 6/1990 | Ishii et al. | 123/673 |
| 4,964,390 | A * | 10/1990 | Kameta et al. | 123/675 |
| 4,987,871 | A * | 1/1991 | Nishikawa | 123/362 |
| 4,991,559 | A * | 2/1991 | Osawa et al. | 123/682 |
| 5,040,513 | A * | 8/1991 | Schnaibel et al. | 123/488 |
| 5,150,301 | A * | 9/1992 | Kashiwabara et al. | 701/106 |
| 5,220,904 | A * | 6/1993 | Miyashita et al. | 123/680 |
| 5,265,581 | A * | 11/1993 | Nagaishi | 123/675 |
| 5,546,911 | A * | 8/1996 | Iwamoto et al. | 123/497 |
| 5,615,660 | A * | 4/1997 | Iwano et al. | 123/680 |
| 5,777,204 | A * | 7/1998 | Abe | 73/23.32 |
| 6,014,962 | A * | 1/2000 | Sato et al. | 123/674 |
| 6,161,530 | A * | 12/2000 | Kakizaki et al. | 123/674 |
| 6,195,988 | B1 * | 3/2001 | Yasui et al. | 60/285 |
| 6,513,509 | B1 * | 2/2003 | Matsumoto | 123/674 |
| 6,782,696 | B2 * | 8/2004 | Shigahara et al. | 60/285 |
| 7,043,900 | B2 * | 5/2006 | Shirakawa et al. | 60/280 |
| 7,159,389 | B2 * | 1/2007 | Miura | 60/295 |
| 2002/0173898 | A1 * | 11/2002 | Itoyama et al. | 701/104 |
| 2010/0132681 | A1 * | 6/2010 | Okazaki et al. | 123/703 |
| 2013/0046451 | A1 * | 2/2013 | Suzuki et al. | 701/102 |

FOREIGN PATENT DOCUMENTS

| | | | |
|---|---|---|---|
| JP | 57-105530 | 7/1982 | |
| JP | S61081536 A | 4/1986 | |
| JP | S61087935 A | 5/1986 | |
| JP | 04279744 A | 10/1992 | |
| JP | 2976547 B | 11/1999 | |
| JP | 2003227381 A | 8/2003 | |
| JP | 2006183570 A | 7/2006 | |
| JP | 2006-226234 | 8/2006 | |
| JP | 2006-226234 A * | 8/2006 | F02D 41/14 |

OTHER PUBLICATIONS

State Intellectual Property Office of The People's Republic of China, Office Action of 2011103971992, Jun. 23, 2014, 8 pages.
European Patent Office, Extended European Search Report of EP11193640.7, Nov. 9, 2014, Germany, 7 pages.

* cited by examiner

Fig.5B — 73: FO2RAM (Throttle Valve Opening Degree vs Engine Speed)

| 0.87 | 0.85 | 0.82 | 0.79 | 0.83 | 0.83 |
|------|------|------|------|------|------|
| 0.89 | 0.88 | 0.83 | 0.81 | 0.84 | 0.83 |
| 0.90 | 0.89 | 0.84 | 0.83 | 0.83 | 0.82 |
| 0.89 | 0.87 | 0.84 | 0.89 | 0.89 | 0.81 |
| 0.89 | 0.88 | 0.84 | 0.84 | 0.89 | 0.88 |
| 0.90 | 0.89 | 0.89 | 0.84 | 0.87 | 0.89 |
| 0.92 | 0.89 | 0.83 | 0.84 | 0.86 | 0.84 |
| 0.90 | 0.90 | 0.85 | 0.84 | 0.85 | 0.81 |
| 0.90 | 0.89 | 0.86 | 0.84 | 0.83 | 0.79 |
| 0.89 | 0.89 | 0.86 | 0.85 | 0.82 | 0.79 |

Fig.5A — 71: TBASE (Throttle Valve Opening Degree vs Engine Speed)

| #### (12.8) | #### (12.5) | #### (12.0) | #### (11.6) | #### (12.2) | #### (12.2) |
| #### (13.1) | #### (12.9) | #### (12.2) | #### (11.9) | #### (12.3) | #### (12.2) |
| #### (13.1) | #### (13.1) | #### (12.3) | #### (12.2) | #### (12.2) | #### (12.0) |
| #### (13.2) | #### (12.8) | #### (12.3) | #### (13.1) | #### (13.1) | #### (11.9) |
| #### (13.1) | #### (12.9) | #### (13.1) | #### (12.3) | #### (13.1) | #### (12.9) |
| #### (13.1) | #### (13.2) | #### (12.2) | #### (12.3) | #### (12.8) | #### (13.1) |
| #### (13.3) | #### (13.1) | #### (12.5) | #### (12.3) | #### (12.6) | #### (13.1) |
| #### (13.5) | #### (13.2) | #### (12.6) | #### (12.3) | #### (12.5) | #### (12.3) |
| #### (13.3) | #### (13.1) | #### (12.6) | #### (12.3) | #### (12.2) | #### (11.9) |
| #### (13.2) | #### (13.1) | #### (12.3) | #### (12.5) | #### (12.0) | #### (11.6) |

173

| THROTTLE VALVE OPENING DEGREE | | | | | | |
|---|---|---|---|---|---|---|
| #### × 0.88 | #### × 0.86 | #### × 0.83 | #### × 0.80 | #### × 0.84 | #### × 0.84 |
| #### × 0.90 | #### × 0.89 | #### × 0.84 | #### × 0.82 | #### × 0.85 | #### × 0.84 |
| #### × 0.91 | #### × 0.90 | #### × 0.85 | #### × 0.84 | #### × 0.84 | #### × 0.83 |
| #### × 0.90 | #### × 0.88 | #### × 0.85 | #### × 0.90 | #### × 0.90 | #### × 0.82 |
| #### × 0.90 | #### × 0.89 | #### × 0.90 | #### × 0.95 | #### × 0.90 | #### × 0.89 |
| #### × 0.92 | #### × 0.91 | #### × 0.84 | #### × 0.85 | #### × 0.88 | #### × 0.90 |
| #### × 0.93 | #### × 0.90 | #### × 0.86 | #### × 0.85 | #### × 0.87 | #### × 0.90 |
| #### × 0.92 | #### × 0.91 | #### × 0.87 | #### × 0.85 | #### × 0.86 | #### × 0.85 |
| #### × 0.91 | #### × 0.90 | #### × 0.87 | #### × 0.85 | #### × 0.84 | #### × 0.82 |
| #### × 0.90 | #### × 0.90 | #### × 0.85 | #### × 0.86 | #### × 0.83 | #### × 0.80 |

(Rows labeled by ENGINE SPEED)

Fig.15

AIR-FUEL RATIO CONTROL SYSTEM AND AIR-FUEL RATIO CONTROL METHOD OF INTERNAL COMBUSTION ENGINE

BACKGROUND OF THE INVENTION

1. Field of the Invention

The present invention generally relates to an air-fuel ratio control system and an air-fuel ratio control method of an internal combustion engine. More particularly, the present invention relates to an air-fuel ratio control system and an air-fuel ratio control method of an internal combustion engine, which perform feedback control of an air-fuel ratio of an air-fuel mixture using an air-fuel ratio sensor.

2. Description of the Related Art

Conventionally, in order to reduce an HC amount and an NOx amount in exhaust gas, and ensure an adequate driving power of an internal combustion engine, it is required that an air-fuel ratio of an air-fuel mixture be controlled to reach a desired value (target value) for each running range of the engine. To implement this, Japanese Laid-Open Patent Application Publication Nos. Sho. 57-105530 and 2006-226234 disclose a technique ($O_2$ feedback control) for performing feedback control of an air-fuel ratio of an air-fuel mixture by controlling an injector using an $O_2$ sensor provided in an exhaust system.

An output characteristic, for example, an output voltage of the $O_2$ sensor changes when an air-fuel ratio becomes closer to a theoretical air-fuel ratio. It can be detected only whether the air-fuel mixture is lean or rich by monitoring the output of the $O_2$ sensor, and therefore, a value of the air-fuel ratio cannot be detected. For this reason, the conventional $O_2$ feedback control uses a method which gradually changes a feedback compensation coefficient for making compensation for a fuel feed amount while monitoring whether the output of the $O_2$ sensor indicates a lean air-fuel ratio or a rich air-fuel ratio. Unlike normal feedback control, setting the feedback compensation coefficient according to a deviation is unfeasible. As a result, the air-fuel ratio which can be achieved during the $O_2$ feedback control is limited to a value close to the theoretical (stoichiometric) air-fuel ratio at which the output characteristic of the $O_2$ sensor changes in a manner that can be used for feedback control.

However, an air-fuel ratio in a certain running range of the engine is set to a value other than the theoretical air-fuel ratio. Particularly, in straddle-type vehicles such as a motorcycle, to ensure a level of engine driving power output or to protect an engine, various target air-fuel ratios are set to correspond to running ranges of the engine, respectively. Therefore, a running range in which the $O_2$ feedback control is enabled is especially limited. If the control method in which the feedback compensation coefficient is changed gradually is used in such a case, an actual air-fuel ratio cannot become the desired air-fuel ratio at a time when the $O_2$ feedback control is initiated, or when a compensation amount required in the $O_2$ feedback control changes rapidly because of an abrupt change in the running range. As a result, the quality of exhaust gas is degraded, or the engine driving power becomes less than desired. This is a first problem associated with a conventional method.

If an air-fuel ratio realized by the control is limited to the theoretical air-fuel ratio, the quality of exhaust gas may be degraded, or the engine driving power may become less than desired. In non-$O_2$-feedback control mode, in a running range in which an air-fuel ratio other than the theoretical air-fuel ratio is required to, for example, ensure a level of engine driving power output or to protect the engine. This is because, for example, it is impossible to make compensation for a fuel amount if the air-fuel ratio is deviated from a desired value due to degradation of the engine.

By comparison, Japanese Laid-Open Patent Application Publication No. 2006-226234 discloses a technique in which engine operation control is executed so that the air-fuel ratio reaches a value closer to the theoretical air-fuel ratio in such a manner that compensation is made for a base fuel amount by changing the feedback compensation coefficient, while monitoring an output of an $O_2$ sensor by $O_2$ feedback control, the feedback compensation coefficient at a time point when the air-fuel ratio reaches the value closer to the theoretical air-fuel ratio is learned, and compensation is made for the base fuel amount, using the learned feedback compensation coefficient, in a non-$O_2$-feedback control mode.

In the conventional technique in which the feedback compensation coefficient is learned during the $O_2$ feedback control, the feedback compensation coefficient is affected by a deviation between a target air-fuel ratio and the theoretical air-fuel ratio, in addition to a deviation of the air-fuel ratio due to degradation of the engine or the like, because a target air-fuel ratio changes over time according to the running state in an engine in which target air-fuel ratios are set to respectively correspond to the running states, like an engine in a straddle-type vehicle. Therefore, it is difficult to correctly detect only the deviation of the air-fuel ratio due to degradation of the engine or the like, based on the feedback compensation coefficient, and to prevent degradation of the quality of exhaust gas or occurrence of an undesired driving power output characteristic in the non-$O_2$-feedback control mode, in the non-$O_2$-feedback control mode. This is a second problem associated with the conventional method.

SUMMARY OF THE INVENTION

The present invention addresses the above described conditions, and a primary object of the present invention is to reduce a time required to cause an air-fuel ratio to reach a value closer to a theoretical air-fuel ratio, thereby suppressing degradation of the quality of exhaust gas or suppressing an engine driving power from becoming lower than desired, when $O_2$ feedback control is started or a compensation amount required for the $O_2$ feedback control change rapidly. A secondary object of the present invention is to, in a non-$O_2$ feedback control mode, correctly detect a deviation between a target air-fuel ratio and an actual air-fuel ratio based on an $O_2$ feedback compensation coefficient attained in the $O_2$ feedback control mode and make compensation for the air-fuel ratio in the non-$O_2$ feedback control mode, thereby suppressing degradation of the quality of exhaust gas or suppressing the engine driving power from becoming lower than desired.

According to the present invention, an air-fuel ratio control system of an internal combustion engine comprises a running state detector for detecting a running state of the internal combustion engine; an air-fuel ratio sensor which changes an output characteristic thereof when an air-fuel ratio of exhaust gas is closer to a theoretical air-fuel ratio; a fuel feed device for feeding a fuel to the internal combustion engine such that a fuel feed amount is adjustable; a fuel amount determiner for determining a fuel command value indicating a fuel feed amount of the fuel to be fed by the fuel feed device; and a memory for storing a first correspondence between running state reference coefficients and running states of the internal combustion engine, and a second correspondence between running state compensation coefficients and the running states, the running state reference coefficients indicating reference fuel feed amounts corresponding to the running states, respectively; the running state compensation coefficients being used to make compensation for the fuel feed amounts corresponding to the running states, respectively, to cause the air-fuel ratio indicated by the air-fuel ratio sensor to reach the theoretical air-fuel ratio; wherein the fuel amount determiner has a feedback control mode in which the fuel amount determiner determines a running state reference coefficient corresponding to the running state detected by the running state detector based on the first correspondence stored in the memory, determines a running state compensation coefficient corresponding to the running state detected by the running state detector based on the second correspondence stored in the memory, determines a feedback compensation coefficient used to cause the air-fuel ratio to reach a value closer to the theoretical air-fuel ratio based on the output of the air-fuel ratio sensor, and determines the fuel command value using a formula including the determined running state reference coefficient, the determined running state compensation coefficient, and the determined feedback compensation coefficient.

In accordance with the above configuration, the memory contains the second correspondence between the running states and the running state compensation coefficients relating to fuel feed amounts with which the air-fuel ratio becomes the theoretical air-fuel ratio in such a manner that the running state compensation coefficients respectively correspond to the running states. When the fuel command value is determined in the feedback control mode, compensation is made for the running state reference coefficient based on the running state compensation coefficient and the feedback compensation coefficient used to cause the air-fuel ratio to reach a value closer to the theoretical air-fuel ratio. Since compensation is made for the running state reference coefficient based on the running state compensation coefficient in this way, the air-fuel ratio can change to the value closer to the theoretical air-fuel ratio quickly after the start of the feedback control mode, irrespective of the running state of the internal combustion engine. This makes it possible to a lessen a variation in a time required to cause the air-fuel ratio to reach the value closer to the theoretical air-fuel ratio after the start of the feedback control, which variation arises due to a difference between the running states, and to reduce the time required to cause the air-fuel ratio to reach the value closer to the theoretical air-fuel ratio. In other words, since the coefficient depending on the running state is treated separately from the feedback compensation coefficient, it is not necessary to cause the coefficient depending on the running state to converge by feedback. Thus, the time required to cause the air-fuel ratio to reach the value closer to the theoretical air-fuel ratio can be reduced. As a result, the first problem can be solved.

The air-fuel ratio control system may further comprise a learning value calculator for calculating a degradation learning compensation coefficient used to suppress negative effects of degradation of the internal combustion engine which has progressed over time, based on the feedback compensation coefficient determined in the feedback control mode; wherein the memory may update and store the degradation learning compensation coefficient; the fuel amount determiner may have a non-feedback control mode in which the fuel amount determiner may determine a running state reference coefficient corresponding to the running state detected by the running state detector based on the first correspondence stored in the memory, read the degradation learning compensation coefficient stored in the memory, and determine the fuel command value using a formula including the determined running state reference coefficient and the read degradation learning compensation coefficient irrespective of the output of the air-fuel ratio sensor.

In the present invention, the feedback compensation coefficient may be recognized as an additional compensation coefficient needed to cause the air-fuel ratio to reach a value closer to the theoretical air-fuel ratio after compensation is made for the running state reference coefficient based on the running state compensation coefficient. For example, the feedback compensation coefficient serves to make compensation to suppress negative effects attributed to degradation of engine components which has progressed over time. In the non-feedback control mode, compensation is made for the running state reference coefficient based on the degradation learning compensation coefficient calculated based on the feedback compensation coefficient to determine the fuel command value. Therefore, the air-fuel ratio can be maintained at a value suitable for the corresponding running state, irrespective of the degradation which has progressed over time. That is, it is possible to lessen a change in the air-fuel ratio of the exhaust gas which would be attributed to the degradation which has progressed over time, by using the compensation coefficient for making compensation to suppress negative effects of the degradation which has progressed over time.

The learning value calculator may calculate degradation learning compensation coefficients for the running states, respectively; and the memory may store a third correspondence indicating a relation between the running states and the degradation learning compensation coefficients, for each of the running states.

In accordance with this configuration, compensation can be made for the running state reference coefficient using the degradation learning compensation coefficient to address a situation in which the feedback compensation coefficient is different depending on the running state.

The learning value calculator may calculate a weighted average derived by weighting a plurality of degradation learning compensation coefficients stored in the memory to respectively correspond to the running states, and calculate a representative value of the degradation learning compensation coefficients based on the weighted average; the memory may update and store the representative value calculated by the learning value calculator; and the fuel amount determiner may calculate the fuel command value by applying the representative value to the formula including the degradation learning compensation coefficient, in the non-feedback control mode.

In accordance with this configuration, even when the running state is in a particular running range in which the feedback control mode is less likely to be executed, the fuel command value can be determined by using a representative value which reflects a novel degradation learning compensation value corresponding to another running range, in the non-feedback control mode.

The feedback compensation coefficient may include a closed-loop compensation value, a real time learning value and a long-period learning value; the closed-loop compensation value may be set to change to cause the air-fuel ratio to reach a value closer to the theoretical air-fuel ratio, and to change from increasing to decreasing or from decreasing to increasing every time the output of the air-fuel ratio sensor is inverted; the real time learning value may be set to change to cause the air-fuel ratio to reach a value closer to the theoretical air-fuel ratio in a period during which the closed-loop compensation value does not cross a predetermined reference value, when the closed-loop compensation value changes from increasing to decreasing or from decreasing to increasing, and to maintain a value at a time point when the closed-loop compensation value crosses the predetermined reference value, when the closed-loop compensation value changes from increasing to decreasing or from decreasing to increasing; and the long-period learning value is set to be added with a predetermined value and the real time learning value is set to be a value derived by subtracting the predetermined from the real time learning value concurrently with the addition of the predetermined value to the long-period learning value, when the real time learning value reaches a predetermined threshold. In this case, the learning value calculator may calculate the degradation learning compensation coefficient based on the long-period learning value.

In accordance with this configuration, since the degradation learning compensation coefficient is calculated using only a part of the feedback compensation coefficients, it is possible to effectively suppress the degradation learning compensation coefficient from being affected undesirably by an abrupt fluctuation in the feedback compensation coefficient. It should be noted that the predetermined value may be a positive value or a negative value.

The memory may be configured to preserve the degradation learning compensation coefficient in a state where an ignition switch of the internal combustion engine is OFF.

In accordance with this configuration, compensation using the degradation learning compensation coefficient can be initiated just after the ignition switch is turned ON.

The air-fuel ratio control system may comprise a combustion state determiner for determining whether or not a combustion state of the internal combustion engine is unstable; and the fuel amount determiner may diminish the degradation learning compensation coefficient if the combustion state determiner determines that the combustion state is unstable, in the idle mode.

In accordance with this configuration, it is possible to effectively prevent compensation using the degradation learning compensation coefficient from being performed to an excess level, which would result in an unstable combustion state.

The air-fuel ratio control system may comprise a combustion state determiner for determining whether or not a combustion state of the internal combustion engine is unstable; wherein the fuel amount determiner may have an idle mode in which the fuel amount determiner determines the running state reference coefficient corresponding to an idle range, and an idle compensation coefficient used to cause the output of the air-fuel ratio sensor to change to a value indicating a lean air-fuel ratio, and determines the fuel command value using a formula including the determined running state reference coefficient and the determined idle compensation coefficient, when the running state detected by the running state detector is in the idle range; and the fuel amount determiner may diminish the idle compensation coefficient when the combustion state determiner determines that the combustion state is unstable.

In accordance with this configuration, in the idle range in which the combustion state tends to be unstable, air-fuel ratio control is performed in a manner different from that corresponding to another running range. In this idle mode, it is possible to diminish the idle compensation coefficient based on whether or not the combustion state is unstable. As a result, it is possible to effectively prevent compensation using the idle compensation coefficient from being performed to an excess level, which would result in an unstable combustion state.

The fuel amount determiner may obtain a value of the running state compensation coefficient based on the running state detected by the running state detector, and gradually change the running state compensation coefficient to the obtained value, when the feedback control mode is started.

In accordance with this configuration, it is possible to effectively suppress a possibility that a fuel feed amount changes rapidly and thereby the driving power output of the internal combustion engine changes rapidly, when the control mode shifts or switches.

According to another aspect of the present invention, there is provided a method of controlling an air-fuel ratio of an internal combustion engine including a fuel feed device for feeding a fuel to the internal combustion engine such that a fuel feed amount is adjustable; the method comprising: pre-storing a first correspondence between running state reference coefficients and running states of the internal combustion engine, and a second correspondence between running state compensation coefficients and the running states, the running state reference coefficients indicating reference fuel feed amounts corresponding to the running states, respectively; the running state compensation coefficients being used to make compensation for the fuel feed amounts corresponding to the running states, respectively, to cause the air-fuel ratio indicated by the air-fuel ratio sensor to reach the theoretical air-fuel ratio; determining a running state reference coefficient corresponding to a running state detected by a running state detector based on the pre-stored first correspondence; determining a running state compensation coefficient corresponding to the running state detected by the running state detector based on the pre-stored second correspondence; determining a feedback compensation coefficient used to cause an air-fuel ratio to reach a value closer to a theoretical air-fuel ratio based on an output of an air-fuel ratio sensor which changes an output characteristic thereof when an air-fuel ratio of exhaust gas is closer to the theoretical air-fuel ratio; and determining a fuel command value indicating the fuel feed amount of the fuel to be fed by the fuel feed device using a formula including the determined running state reference coefficient, the determined running state compensation coefficient, and the determined feedback compensation coefficient. In accordance with this method, compensation using the running state compensation coefficient is performed like the above control system, when the fuel command value is determined (decided) using a formula including the feedback compensation coefficient determined based on the output of the air-fuel ratio sensor quickly. Therefore, the air-fuel ratio can reach a value closer to the theoretical air-fuel ratio.

The above and further objects, features and advantages of the invention will more fully be apparent from the following detailed description with reference to the accompanying drawings.

BRIEF DESCRIPTION OF THE DRAWINGS

FIG. 5A is a schematic view of a running state reference coefficient map stored in a memory of FIG. 3, and FIG. 5B is a schematic view of a running state compensation coefficient map stored in the memory of FIG. 3.

FIG. 15 is a schematic view of a running state compensation amount map.

DETAILED DESCRIPTION OF THE PREFERRED EMBODIMENTS

Hereinafter, an embodiment of the present invention which is applied to a motorcycle, which is an exemplary straddle-type vehicle, will be described with reference to the drawings. The stated directions are referenced from the perspective of a driver straddling the motorcycle, except for explicitly noted. For the purpose of clarity, the same reference symbols will be used to identify similar components, and repetitive description thereof is omitted.

Figure 1:
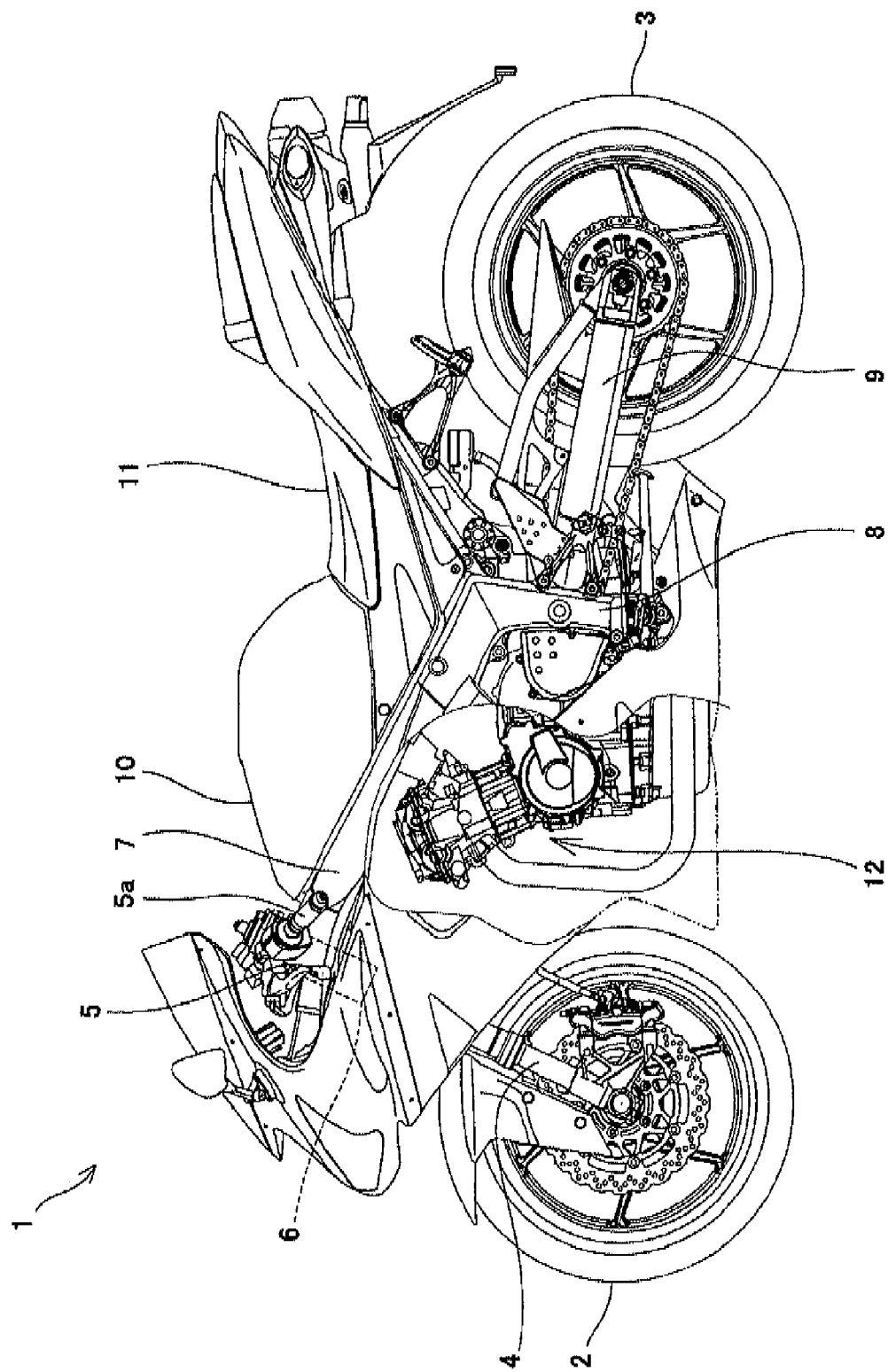
FIG. 1 is a left side view of a motorcycle incorporating an air-fuel ratio control system according to an embodiment of the present invention.

FIG. 1 is a left side view of a motorcycle 1 incorporating an air-fuel ratio control system according to an embodiment of the present invention. The motorcycle 1 includes a front wheel 2 and a rear wheel 3. The front wheel 2 is rotatably mounted to a front fork 4. The front fork 4 is coupled to a handle 5 via a steering shaft (not shown) rotatably supported by a head pipe 6. One grip of the handle 5 constitutes a throttle grip 5a. A pair of right and left main frame members 7 extends rearward and downward from the head pipe 6. Pivot frames 8 extend downward from the main frame members 7, respectively. The front end portions of swing arms 9 are pivoted to the pivot frames 8, respectively. The rear wheel 3 is rotatably mounted to the rear end portions of the swing arms 9. A fuel tank 10 is positioned above the main frame members 7 and rearward relative to the handle 5. A seat 11 straddled by the driver is disposed rearward relative to the fuel tank 10. A multi-cylinder four-cycle engine 12 is mounted below the main frames 7. A driving power generated by the engine 12 is transmitted to the rear wheel 3 via a transmission (not shown) and a chain.

Figure 2:
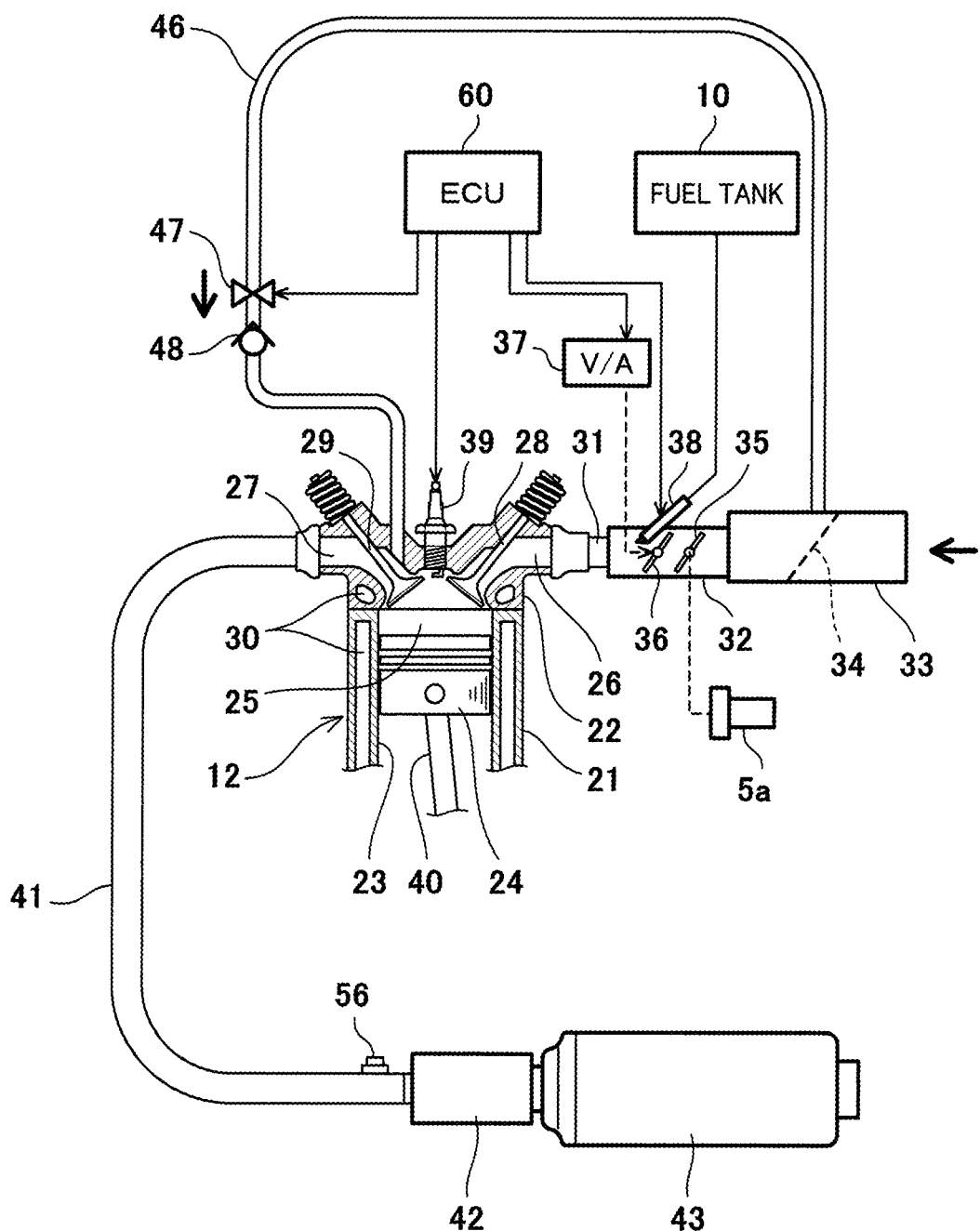
FIG. 2 is a schematic view showing a configuration of an air-intake system and an exhaust system in an engine of FIG. 1.

FIG. 2 is a schematic view showing a configuration of an air-intake system and an exhaust system in the engine 12 of FIG. 1. Although only one cylinder is shown in FIG. 2, other cylinders are configured in the same manner. As shown in FIG. 2, the engine 12 includes a cylinder block 21 and a cylinder head 22. The cylinder block 21 includes a plurality of cylinders 23. Each cylinder 23 accommodates a piston 24 such that the piston 24 is slidable within the cylinder 23. At the upper side of each piston 24, a combustion chamber 25 which is a combustion portion of an internal combustion engine is formed. The cylinder head 22 includes an intake port 26 through which intake-air is supplied to each combustion chamber 25 and an exhaust port 27 through which exhaust gas is exhausted from the combustion chamber 25. The intake port 26 is opened and closed by an intake valve 28, while the exhaust port 27 is opened and closed by an exhaust valve 29. The engine 12 is a water-cooled engine. Each of the cylinder block 21 and the cylinder head 22 includes a water jacket 30 through which cooling water flows.

An air-intake pipe 31, a throttle device 32 and an air cleaner 33 are coupled to the intake port 26 in that order. The air cleaner 33 includes therein an air filter 34 for cleaning air taken in from outside. The throttle device 32 includes a main throttle valve 35 and a sub-throttle valve 36, and controls the amount of clean air supplied from the air cleaner 33 to the combustion chamber 25, based on the opening degree of the main throttle valve 35 and the opening degree of the sub-throttle valve 36. The main throttle valve 35 is coupled to the throttle grip 5a via a cable. When the driver rotates the throttle grip 5a, the opening degree of the main throttle valve 35 is changed mechanically. The sub-throttle valve 36 is actuated by a valve actuator 37 such as an electric motor. The operation of the valve actuator 37 is controlled by an engine control unit 60 (hereinafter referred to as "ECU").

A fuel injection device 38 is attached to the throttle device 32 or the air-intake pipe 31 to inject fuel stored in the fuel tank 10. In a state where the intake valve 28 opens the intake port 26, an air-fuel mixture of the clean air passing through the throttle device 32 and the fuel injected by the fuel injection device 38 is supplied to the combustion chamber 25 via the intake port 26. An ignition plug 39 is attached to the cylinder head 22 for each cylinder to generate a spark inside the combustion chamber 25. The ignition plug 39 ignites and combusts the air-fuel mixture compressed inside the combustion chamber 25. Thereby, the piston 24 moves downward, and a crankshaft (not shown) coupled to the piston 24 via a connecting rod 40 rotates. The operation of the fuel injection device 38 and the operation of the ignition plug 39 are controlled by the ECU 60. In the engine 12, four fuel injection devices 38 are provided to respectively correspond to the cylinders, and are controlled independently of each other so that the air-fuel ratio of the air-fuel mixture supplied to the combustion chamber 25 can be adjusted for each cylinder. Note that two or more fuel injection devices 38 may be provided for each cylinder, or the fuel injection device 38 may be positioned to directly inject the fuel to the inside of the fuel injection device 38.

An exhaust pipe 41, a ternary catalyst pipe 42 and a muffler 43 are coupled to the exhaust port 27 in that order. In a state where the exhaust valve 29 opens the exhaust port 27, exhaust gas resulting from combustion is exhausted from inside the cylinder 23 and the combustion chamber 25 which have ignited and combusted the air-fuel mixture, to outside the motorcycle 1, through the exhaust port 27, the exhaust pipe 41, the ternary catalyst pipe 42 and the muffler 43.

The air cleaner 33 is coupled to the exhaust port 27 via a secondary air supply pipe 46 and is configured to supply the clean air to the exhaust port 27 through the secondary air supply pipe 46 such that the clean air bypasses the throttle device 32 and the combustion chamber 25 (hereinafter the clean air supplied to the exhaust port 27 is referred to as "secondary air"). By supplying the secondary air to the exhaust port 27, the exhaust gas can be re-combusted so as to reduce the CO and HC contained therein. The secondary air supply pipe 46 is provided with a secondary air supply valve 47 for opening and closing the secondary air supply pipe 46, and a check valve 48 for inhibiting a back flow of the exhaust gas from the exhaust port 27. The operation of the secondary air supply valve 47 is controlled by the ECU 60.

The exhaust pipe 41 is attached with an $O_2$ sensor 56 (air-fuel ratio sensor). The $O_2$ sensor 56 outputs to the ECU 60, a signal corresponding to an oxygen concentration of the exhaust gas before it is subjected to a catalytic action in the ternary catalyst pipe 42. The oxygen concentration of the exhaust gas changes according to the air-fuel ratio of the air-fuel mixture supplied to the combustion chamber 25. By comparison, the output characteristic (e.g., output voltage) of the $O_2$ sensor 56 changes rapidly with a great changing magnitude, when the air-fuel ratio of the air-fuel mixture supplied to the combustion chamber 25 is closer to the theoretical air-fuel ratio, in a state where the secondary air supply valve 47 closes the secondary air supply pipe 46. This enables the ECU 60 to determine whether the air-fuel ratio of the air-fuel mixture supplied to the combustion chamber 25 is a lean air-fuel ratio or a rich air-fuel ratio, based on whether the output of the $O_2$ sensor 56 is a high value or a low value. In a state where the secondary air supply valve 47 opens the secondary air supply pipe 46, the ECU 60 can determine whether the air-fuel ratio of the air-fuel mixture including the secondary air is the lean air-fuel ratio or the rich air-fuel ratio.

Figure 3:
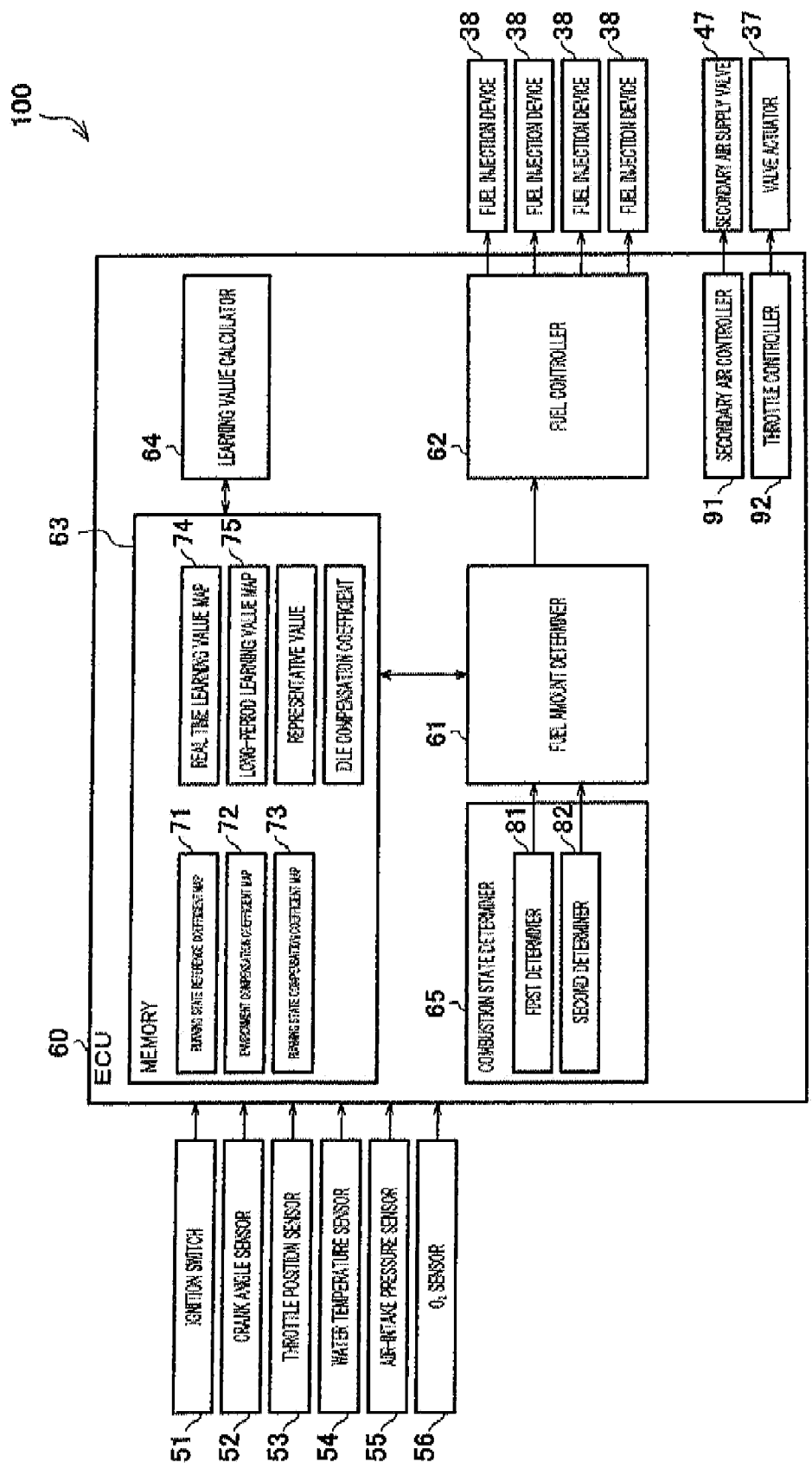
FIG. 3 is a block diagram showing a configuration of the air-fuel ratio control system incorporated into the motorcycle of FIG. 1.

FIG. 3 is a block diagram showing an overall configuration of the air-fuel ratio control system 100 incorporated into the motorcycle 1 of FIG. 1. As shown in FIG. 3, the air-fuel ratio control system 100 includes the ECU 60, the valve actuator 37, the fuel injection devices 38, the secondary air supply valve 47, the $O_2$ sensor 56, an ignition switch 51, a crank angle sensor 52, a throttle position sensor 53, a water temperature sensor 54 and an air-intake pressure sensor 55.

The ignition switch 51 is operated by the driver. When the ignition switch 51 is turned ON, the ECU 60 is supplied with electric power and is able to operate, and the engine 12 is able to operate. The crank angle sensor 52 detects a rotational angle of the crankshaft. The ECU 60 is configured to measure an engine speed (i.e., rotational speed of the crankshaft), based on the output of the crank angle sensor 52. The crank angle sensor 52 can operate as a sensor for detecting the engine speed. The throttle position sensor 53 detects the opening degree of the main throttle valve 35 (hereinafter simply referred to as "throttle valve opening degree"). The water temperature sensor 54 detects a water temperature of cooling water used for cooling the engine 12. The air-intake pressure sensor 55 detects an air-intake pressure.

The ECU 60 controls the operation of the fuel injection device 38 and the operation of the secondary air supply valve 47 based on the outputs of the sensors and switches 51~56, thereby controlling the air-fuel ratio of the air-fuel mixture. To control the air-fuel ratio, an air supply amount can be controlled along with the fuel feed amount by controlling the operation of the valve actuator 37 of the sub-throttle valve 36.

The ECU 60 includes as functional constituents for controlling the air-fuel ratio, a fuel amount determiner 61, a fuel controller 62, a memory 63, a learning value calculator 64, a combustion state determiner 65, a secondary air controller 91 and a throttle controller 92.

The fuel amount determiner 61 determines (decides) a fuel command value TAU indicating the amount (fuel feed amount) of a fuel to be fed from the fuel injection device 38. The fuel command value TAU may be a fuel injection amount, a time at which the fuel injection device 38 injects the fuel, or the like. The fuel controller 62 controls the operation of the fuel injection device 38 so that the fuel is fed to the combustion chamber 25 with the fuel feed amount indicated by the fuel command value TAU determined (decided) by the fuel amount determiner 61. The memory 63 stores coefficients or data used to determine the fuel command value TAU in the fuel amount determiner 61. The learning value calculator 64 calculates a degradation learning compensation coefficient and its representative value. The combustion state determiner 65 determines whether or not the combustion state is stable. The combustion state determiner 65 includes a first determiner 81 and a second determiner 82 which determine whether or not the combustion state is stable, using different methods as described later. The secondary air controller 91 causes the secondary air control valve 47 to open or close the secondary air supply pipe 46. When the running state of the engine E is in an idle range, or the running state is not in the idle range but a driving state of the motorcycle 1 is a state where explosion due to an uncombusted fuel and secondary air is least likely to occur in the exhaust system (non-deceleration state), the secondary air control valve 47 opens the secondary air supply pipe 46. The throttle controller 92 controls the operation of the valve actuator 37 so that the opening degree of the sub-throttle valve 36 reaches a target opening degree.

Figure 4:
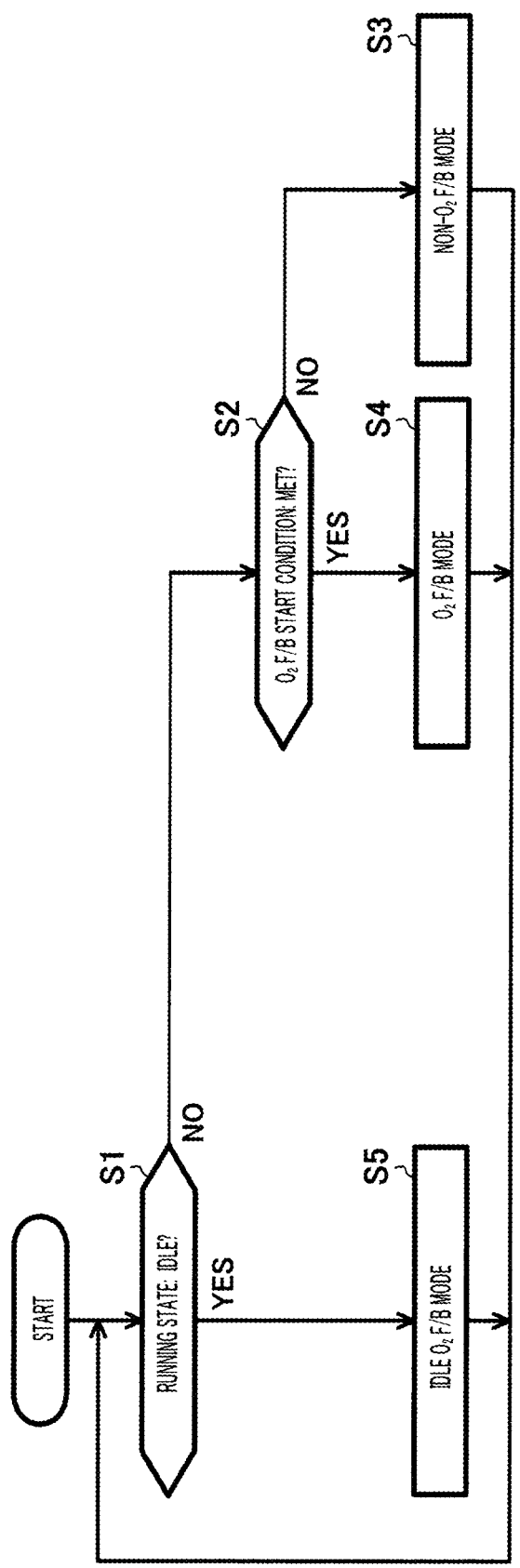
FIG. 4 is a flowchart showing a procedure of a main process in an air-fuel ratio control method executed by the air-fuel ratio control system of FIG. 3.

Referring to FIG. 4, the fuel amount determiner 61 determines whether or not the running state is in the idle range (step S1). If it is determined that the running state is not in the idle range (S1: NO), the fuel amount determiner 61 determines whether or not a predetermined feedback control start condition is met (step S2). If it is determined that the predetermined feedback control start condition is not met (S2: NO), the fuel amount determiner 61 determines (decides) the fuel command value TAU according to a non-$O_2$-feedback control mode (hereinafter referred to as "non-FB mode") (step S3). On the other hand, if it is determined that the predetermined feedback control start condition is met (S2: YES), an $O_2$-feedback control mode (hereinafter referred to as "FB mode") is initiated. In the FB mode, the fuel amount determiner 61 determines (decides) the fuel command value TAU until a predetermined feedback control termination condition is met (step S4). If it is determined that the running state is in the idle range (S1: YES), the fuel amount determiner 61 determines (decides) that the fuel command value TAU is in the idle mode (step S5).

The fuel amount determiner 61 determines that the running state is in the idle range when the engine speed is less than a predetermined engine speed. The fuel amount determiner 61 may determine that the running state is in the idle range when the throttle valve opening degree is less than a predetermined opening degree, and the engine speed is less than the predetermined engine speed. The feedback control start condition includes a condition in which a running state where a harmful exhaust matter should be reduced with a priority is met. Therefore, the FB mode is executed in the running state where the harmful exhaust matter should be reduced with a priority, for example, a constant speed driving state or a gradually accelerated or decelerated state, rather than a state where the engine driving power is required to be increased. In contrast, the non-FB mode is executed in the running state where the engine driving power is required to be increased or decreased with a priority, for example, a rapidly accelerated or decelerated state, rather than the running state where the harmful exhaust matter should be reduced. A desired engine driving power can be estimated based on the throttle valve opening degree, the air-intake pressure, the engine speed, etc. The feedback control start condition may include, for example a condition in which evaporative emission purge is not being performed.

In the FB mode, the fuel amount determiner 61 executes closed-loop control based on the output of the $O_2$ sensor 56, and determines (decides) the fuel command value TAU so that the air-fuel ratio reaches a value closer to the theoretical air-fuel ratio. The assumed air-fuel ratio in the non-FB mode is set to a value different from the theoretical air-fuel ratio, and is set for each running state. In the non-FB mode, the fuel amount determiner 61 executes open-loop control without using the output of the $O_2$ sensor 56 and determines (decides) the fuel command value TAU so that the air-fuel ratio reaches the assumed air-fuel ratio. In the idle mode, the secondary air controller 91 causes the secondary air supply valve 47 to open the secondary air supply pipe 46. The fuel amount determiner 61 determines (decides) the fuel command value TAU so that the air-fuel ratio of the exhaust gas which is detected by the $O_2$ sensor 56, after the secondary air is supplied to the exhaust pipe 41, becomes the lean air-fuel ratio. The fuel command value TAU is determined (decided) according to the following formula (1).

$$TAU = TBASE \times (1 + FKI + FFB) \times FO2RAM \times FBLAF \quad (1)$$

In the formula (1), TBASE is a running state reference coefficient, FKI is an environment compensation coefficient, FO2RAM is a running state compensation coefficient, FFB is a feedback compensation coefficient, and FBLAF is a degradation coefficient. In the present embodiment, when the FB mode is used, compensation using the degradation coefficient FBLAF is disenabled. Therefore, in the case where the formula (1) is used, the degradation coefficient FBLAF is set to 1. When the non-FB mode is used, compensation using the running state compensation coefficient FO2RAM and the feedback compensation coefficient FFB is disenabled, and a degradation learning compensation coefficient or its representative value FDLAF is assigned to the degradation coefficient FBLAF. Therefore, in the case where the formula (1) is used, FO2RAM is set to 1, the feedback compensation coefficient FFB is set to 0, and the degradation coefficient FBLAF is set to the degradation learning compensation coefficient or its representative value FDLAF. When the idle mode is used, compensation using the running state compensation coefficient FO2RAM and the feedback compensation coefficient FFB is disenabled, and an idle compensation coefficient FILAF is assigned to the degradation coefficient FBLAF. Therefore, in the case where the formula (1) is used, the running state compensation coefficient FO2RAM is set to 1, the feedback compensation coefficient FFB is set to zero, and the degradation coefficient FBLAF is set to the idle compensation coefficient FILAF.

As a result, a formula used to determine (decide) the fuel command value TAU in the FB mode is represented by the following formula (2), a formula used to determine (decide) the fuel command value TAU in the non-FB mode is represented by the following formula (3), and a formula used to determine (decide) the fuel command value TAU in the idle mode is represented by the following formula (4). As can be seen from the formula (2), in the FB mode, the fuel command value TAU is calculated using the formula including the running state reference coefficient TBASE, the running state compensation coefficient FO2RAM and the feedback compensation coefficient FFB.

$$TAU = TBASE \times (1 + FKI + FFB) \times FO2RAM \quad (2)$$

$$TAU = TBASE \times (1 + FKI) \times FDLAF \quad (3)$$

$$TAU = TBASE \times (1 + FKI) \times FILAF \quad (4)$$

First of all, description will be given of the running state reference coefficient TBASE and the environment compensation coefficient FKI relating to all of the FB mode, the non-FB mode, and the idle mode. The running state reference coefficient TBASE indicates a fuel feed amount suitable for each running state and a fuel feed amount which is a reference for each running state. The running state reference coefficients TBASE are individually set to values so that a target air-fuel ratio corresponding to each running state falls within a range of a rich air-fuel ratio with respect to the theoretical air-fuel ratio, in view of a balance among various requirements such as achievement of a desired engine driving power, a need for protection of the engine, a need for increasing the engine driving power, and a need for reduction of a harmful exhaust matter. In the present embodiment, the running state reference coefficient TBASE is a value indicating a fuel feed amount required to achieve a target air-fuel ratio for each running state, or an operation time of the fuel injection device 38 required to inject a fuel with this fuel feed amount.

The memory 63 contains a running state reference coefficient map 71 (see FIG. 5A) created by preliminarily finding the running state reference coefficients TBASE for respective running states. Referring to the running state reference coefficient map 71 of FIG. 5A, the running state reference coefficient TBASE is associated with each of a plurality running ranges each of which is defined by the throttle valve opening degree and the corresponding engine speed. In FIG. 5A, "####" indicates the running state reference coefficient TBASE and is a value stored actually in the running state reference coefficient map 71. Although the same symbols are used in FIG. 5A for easier illustration, the numeric values are stored individually to respectively correspond to the running ranges. The numeric value in each parenthesis indicates a value of the air-fuel ratio in a case where the fuel is fed with an amount indicated by the running state reference coefficient TBASE. As can be seen from the map 71 in FIG. 5A, in the motorcycle 1, each target air-fuel ratio is different among the running states, and is a rich air-fuel ratio, for example.

The memory 63 may contain the correspondence between the running state and the running state reference coefficient TBASE in a form other than the map, for example, a calculation formula. The same applies to an environment compensation coefficient map 72 and a running state compensation coefficient map 73 as described below. As the running state, a vehicle speed, a transmission ratio, or an air-intake pressure may be used, in addition to or instead of the engine speed and the throttle valve opening degree.

The environment compensation coefficient FKI is a coefficient used to make compensation for the running state reference coefficient TBASE, based on driving environments such as a cooling water temperature and the air-intake pressure. The fuel amount determiner 61 can select the environment compensation coefficient FKI for each running state, with reference to the environment compensation coefficient map 72 pre-stored in the memory 63, and the output of the water temperature sensor 54 and the output of the air-intake pressure sensor 55. The environment compensation coefficient FKI is a compensation coefficient corresponding to an environment change rate with respect to a reference environment, and is zero when the corresponding environment is the reference environment. The environment compensation coefficient FKI is such that a positive compensation amount is set when fuel increasing compensation is required for the running state reference coefficient TBASE and a negative compensation amount is set when fuel decreasing compensation is required for the running state reference coefficient TBASE to achieve an air-fuel ratio substantially equal to that set based on the running state reference coefficient TBASE in the reference environment when a change occurs in the reference environment.

Next, description will be given of a control method of the air-fuel ratio using the FB mode. The running state compensation coefficient FO2RAM is a compensation coefficient used to make compensation for the fuel feed amount corresponding to each running state so that the corresponding air-fuel ratio reaches the theoretical air-fuel ratio. To be more specific, the running state compensation coefficient FO2RAM is a compensation coefficient used to make compensation for the running state reference coefficient TBASE so that the air-fuel ratio reaches the theoretical air-fuel ratio in a certain ideal running state in which there is no individual difference between products and there is no degradation of the engine component which has progressed over time.

The memory 63 contains a running state compensation coefficient map 73 created by preliminarily finding the running state compensation coefficients FO2RAM for respective running states in the reference environment. As shown in FIG. 5B, the running state compensation coefficient map 73 contains the running state compensation coefficients FO2RAM corresponding to parameters similar to those for determining the running state reference coefficients TBASE, to be specific, the engine speed and the throttle valve opening degree. As can be seen from a comparison between the numeric values depicted in FIG. 5B and the numeric values in parentheses in FIG. 5A, each of the running state compensation coefficients FO2RAM refers to a value derived by dividing the value of an air-fuel ratio in a case where the fuel is fed with an amount indicated by the corresponding running state reference coefficient TBASE, by a value (14.7) of the theoretical air-fuel ratio, i.e., an air excess ratio in the case where the fuel is fed with an amount indicated by the running state reference coefficient TBASE.

The feedback compensation coefficient FFB is a compensation coefficient used to cause the air-fuel ratio to gradually get closer to the theoretical air-fuel ratio, based on the output of the $O_2$ sensor 56, when there is an individual difference between products and there is degradation of the engine components which has progressed over time. As represented by the following formula (5), the feedback compensation coefficient FFB has a closed-loop compensation value FAF and a learning value FLAF. The learning value FLAF is composed of a real time learning value FRLAF and a long-period learning value FLLAF. That is, the feedback compensation coefficient FFB is composed of the closed-loop compensation value FAF, the real time learning value FRLAF and the long-period learning value FLLAF. The three values FAF, FRLAF, and FLLAF, constituting the feedback compensation coefficient FFB are set variably in the middle of the FB mode.

$$FFB=FAF+FLAF=FAF+FRLAF+FLLAF \quad (5)$$

Figure 6:
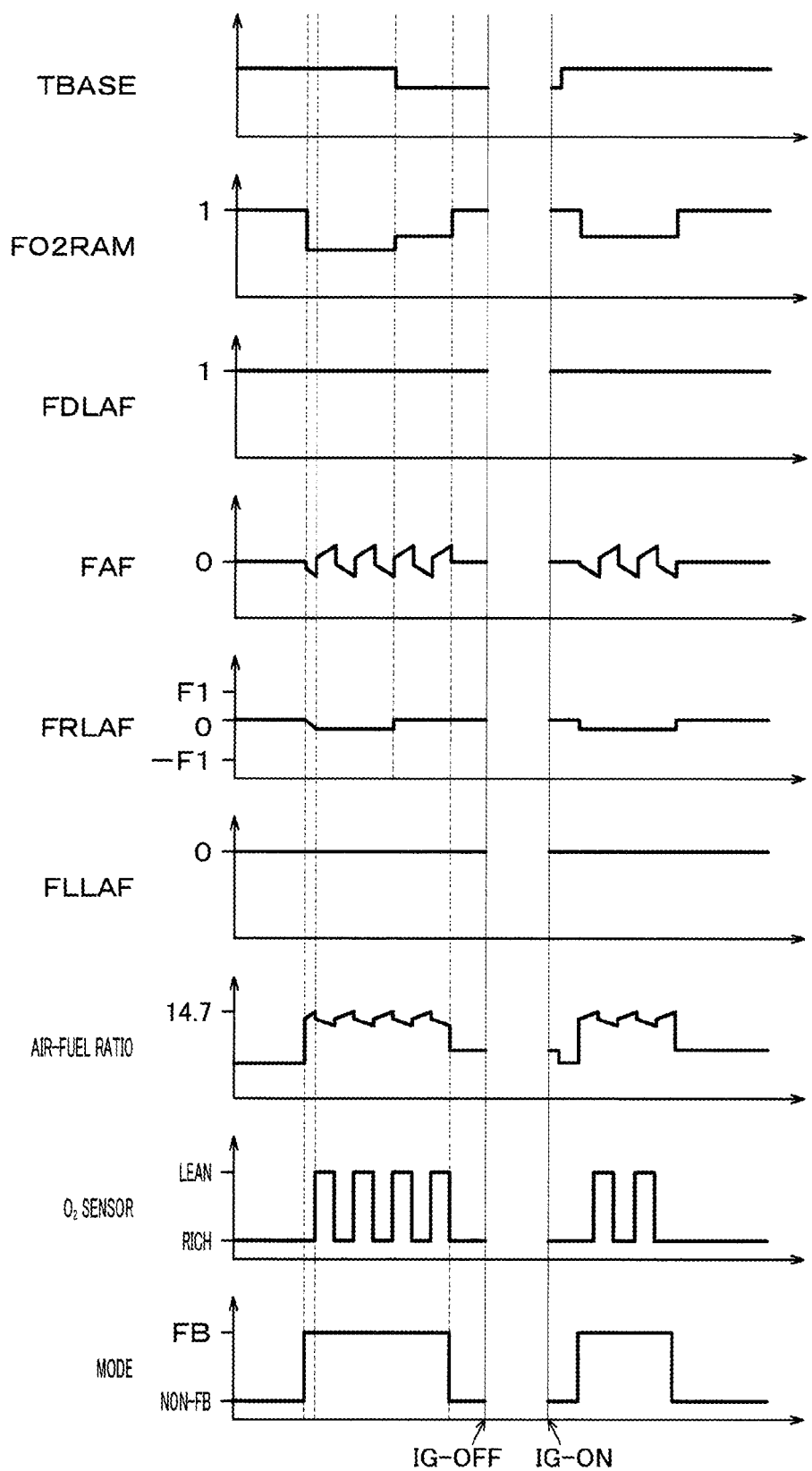
FIG. 6 is a timing chart showing an example of a method of determining (deciding) a fuel command value in an $O_2$ feedback control mode of FIG. 4, and an example of a method of determining (deciding) a fuel command value in a non-$O_2$ feedback control mode of FIG. 4.

FIG. 6 shows an example in which the FB mode is firstly executed in the motorcycle 1 which has been used for a relatively short period of time, and degradation of the engine components which has progressed over time does not occur, but there is an individual difference between products. Note that it is supposed that the environment compensation coefficient FKI is constant (the same applies to the examples shown in FIGS. 8, 13 and 14). In the FB mode, the secondary air supply valve 47 operates to close the secondary air supply pipe 46. When the control mode shifts from the non-FB mode to the FB mode, the running state reference coefficient TBASE and the running state compensation coefficient FO2RAM corresponding to the running state at that point of time are selected from the maps 71 and 73, respectively, and compensation is made for the selected running state reference coefficient TBASE by multiplying the selected running state reference coefficient TBASE by the selected running state compensation coefficient FO2RAM. Since the running state compensation coefficient FO2RAM is the air excess ratio as described above, the air-fuel ratio changes promptly from a target air-fuel ratio in the non-FB mode into a value closer to the theoretical air-fuel ratio.

Just after the compensation using the running state compensation coefficient FO2RAM is performed, the three values FAF, FRLAF, and FLLAF constituting the feedback compensation coefficient FFB are zero, because an opportunity for learning the values FRLAF and FLLAF does not occur yet. After that, the closed-loop compensation value FAF is set variably such that the closed-loop compensation value FAF changes from increasing to decreasing or from decreasing to increasing, every time the output of the $O_2$ sensor is inverted, and the value of the real time learning value FRLAF is changed gradually. FIG. 6 shows a case where, just after the compensation using the running state compensation coefficient FO2RAM is performed, the air-fuel ratio could be changed up to a value closer to the theoretical air-fuel ratio, but the output of the $O_2$ sensor has not changed to a value indicating a lean air-fuel ratio, due to an individual difference between the fuel injection devices 38, a hysteresis characteristic of the $O_2$ sensor 56, etc. Because of this, the value of the real time learning value FRLAF is decreased gradually until the output of the $O_2$ sensor 56 reaches the value indicating the lean air-fuel ratio.

The closed-loop compensation value FAF increases by a predetermined skip value at a time point when the output of the $O_2$ sensor 56 has changed from a value indicating the rich air-fuel ratio to a value indicating the lean air-fuel ratio. The closed-loop compensation value FAF increases gradually with a constant rate until the output of the $O_2$ sensor 56 changes to a value indicating the rich air-fuel ratio next. The closed-loop compensation value FAF decreases by a predetermined skip value at a time point when the output of the $O_2$ sensor has changed from a value indicating the lean air-fuel ratio to a value indicating the rich air-fuel ratio next. The closed-loop compensation value FAF decreases gradually with a constant rate until the output of the $O_2$ sensor 56 changes to a value indicating the lean air-fuel ratio next. The decrease rate and the increase rate of the closed-loop compensation value FAF are preferably set to values greater than a change rate of the real time learning value FRLAF. If not, the output of the $O_2$ sensor 56 cannot be changed when a change from increasing to decreasing or from decreasing to increasing is revered between the closed-loop compensation value FAF and the real time learning value FRLAF (see FIG. 8 in addition to FIG. 6).

By the above change, when the closed-loop compensation value FAF is decreased, a decrease in the real time learning value FRLAF is added. Therefore, the output of the $O_2$ sensor 56 is inverted relatively faster. On the other hand, when the closed-loop compensation value FAF is increased, a decrease in the real time learning value FRLAF is subtracted from the closed-loop compensation value FAF, so that a certain time is required to invert the output of the $O_2$ sensor 56 (see FIG. 8 in addition to FIG. 6). In this way, the closed-loop compensation value FAF changes from increasing to decreasing or from decreasing to increasing and is getting closer to zero at which the control mode shifts to the FB mode.

When the closed-loop compensation value FAF changes by a skip value and crosses the value (zero) at which the control mode shifts to the FB mode, the real time learning value FRLAF and the long-period learning value FLLAF are thereafter maintained at the values at that point of time, whereas the closed-loop compensation value FAF is changed while monitoring the output of the $O_2$ sensor 56 in the same manner. Since the output of the $O_2$ sensor 56 changes before the real time learning value FRLAF reaches a threshold ±F1 in the example of FIG. 6, the long-period learning value FLLAF does not change (i.e., maintained at zero at which the control mode shifts to the FB mode). A case where the real time learning value FRLAF exceeds the threshold ±F1 will be described with reference to FIG. 8 later.

As described above, in the present embodiment, in the FB mode and in the non-FB mode, the running state reference coefficient TBASE indicating a fuel feed amount suitable for the running state is selected from the running state reference coefficient map 71. At a time point at which the FB mode is started, compensation is made for the running state reference coefficient TBASE, using the running state compensation coefficient FO2RAM indicating the air excess ratio of the air-fuel ratio in the case where the fuel is fed with an amount indicated by that running state reference coefficient TBASE. That is, the running state compensation coefficient FO2RAM serves to make compensation for a deviation between a fuel feed amount corresponding to a target air-fuel ratio in the non-FB mode in a certain running state and a fuel feed amount corresponding to the theoretical air-fuel ratio in this running state. In other words, the feedback compensation coefficient FAF does not serve to make compensation for the deviation of the fuel feed amount due to the difference between these air-fuel ratios. The compensation amount corresponding to this deviation may be assumed when the running state reference coefficient map 71 is created. By pre-storing a running state compensation coefficient FO2RAM that operates as a compensation amount in the running state compensation coefficient map 73, which is similar to the running state reference coefficient map 71, it becomes possible to promptly make compensation for the deviation due to the difference between the air-fuel ratios when the FB mode is started, and to thereby promptly change the air-fuel ratio to a value closer to the theoretical air-fuel ratio, in response to a change in the control mode.

Referring to FIG. 6, when the running state of the engine 12 changes rapidly in the middle of the closed-loop control, the running state reference coefficient TBASE may change rapidly in response. In a conventional method, if the running state reference coefficient TBASE changes rapidly, the air-fuel ratio is restored to a value closer to the theoretical air-fuel ratio, by changing a feedback compensation coefficient gradually. This requires a long time to restore the air-fuel ratio. In contrast, in the present embodiment, the running state compensation coefficient FO2RAM changes according to the running state, along with the running state reference coefficient TBASE. Therefore, even when the running state reference coefficient TBASE may change rapidly in response to a rapid change in the running state, and thereby the air-fuel ratio may be deviated from the theoretical air-fuel ratio, compensation is made for the running state reference coefficient TBASE promptly in response to this, and the air-fuel ratio can be maintained at the theoretical air-fuel ratio. When the running state compensation coefficient FO2RAM is changed in response to a change in the running state, the value of the real time learning value FRLAF and the value of the long-period learning value FLLAF, corresponding to the changed running state, are read from the memory 63 just after the change of FO2RAM, and the real time learning value FRLAF and the long-period learning value FLLAF are changed into the read values, rapidly or gradually, respectively. After the real time learning value FRLAF and the long-period learning value FLLAF are changed into the read values, respectively, the real time learning value FRLAF is changed as described above, according to a need for compensation associated with the individual difference between products.

When the control mode shifts from the FB mode to the non-FB mode, the real time learning value FRLAF and the long-period learning value FLLAF are updated and stored in the memory 63. As shown in FIG. 6, in a case where the running state reference coefficient TBASE and the running state compensation coefficient FO2RAM change in response to a change in the running state in the middle of the FB mode, the values set just before this change in the running state are stored to be associated with the running state just before this change, and the values set just before the FB mode terminates are stored to be associated with the running state. An event that the long-period learning value FLLAF are updated and stored in the memory 63 will be described later.

Figure 7:
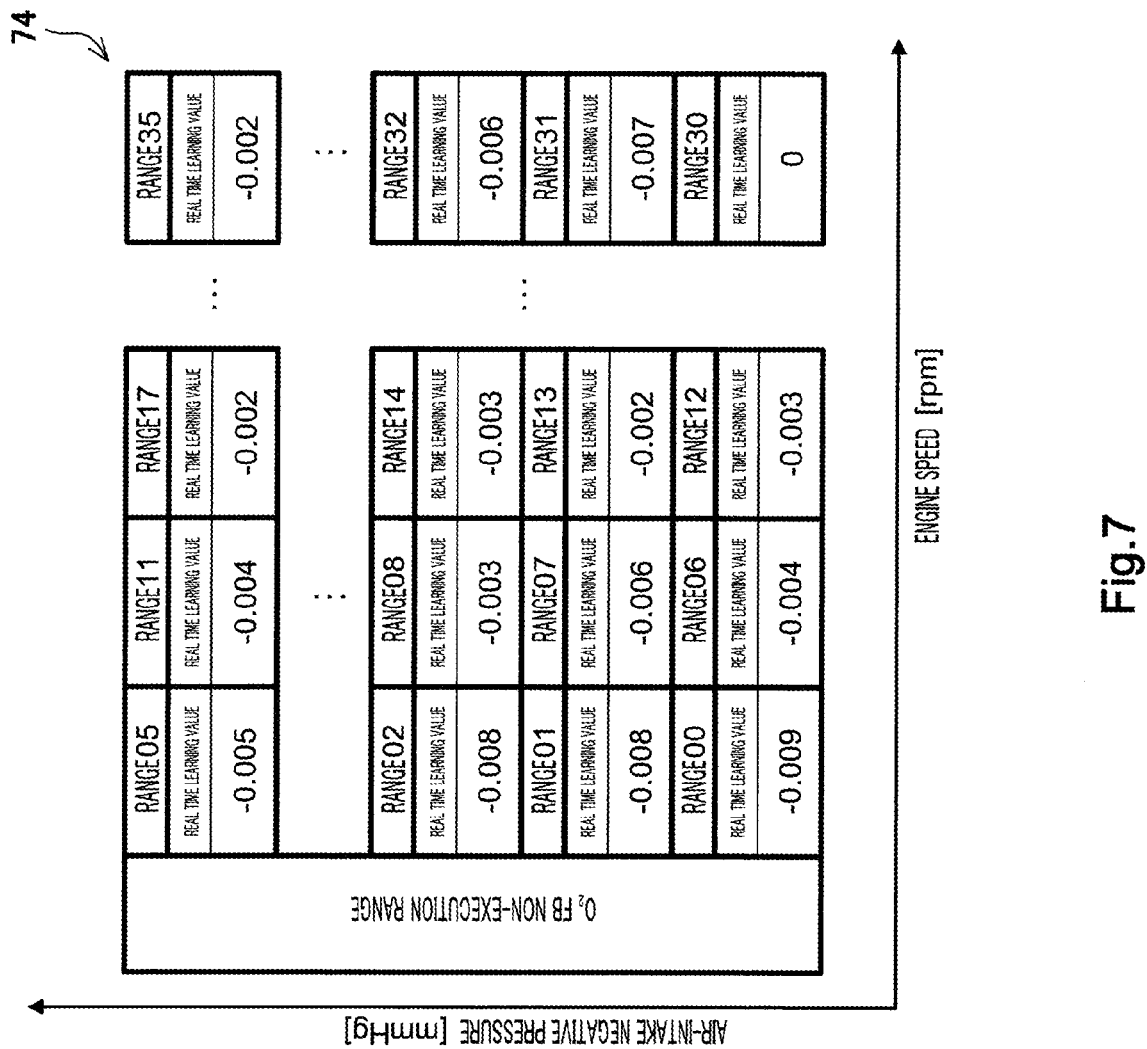
FIG. 7 is a schematic view of a real time learning value map stored in the memory of FIG. 3.

FIG. 7 is a schematic view of the real time learning value map 74 stored in the memory 63. As described above, the real time learning value FRLAF is updated and stored for each running state. To be specific, the memory 63 stores as the real time learning value map 74 a correspondence between the real time learning values FRLAF and the running ranges each of which is defined by the engine speed and the air-intake negative pressure (or throttle valve opening degree) such that the real time learning values FRLAF respectively correspond to the running ranges. The number of the running ranges is not limited to that depicted in FIG. 7, but may be modified suitably. The memory 63 is configured to preserve the real time learning value map 74 even after the ignition switch 51 is turned OFF.

Turning back to FIG. 6, a description will be given of a case where the ignition switch 51 is turned ON after the ignition switch 51 is turned OFF, and thereafter the FB mode starts. Just after the compensation using the running state compensation coefficient FO2RAM is performed, the fuel amount determiner 61 sets the closed-loop compensation value FAF and the long-period learning value FLLAF to zero, because an opportunity for the learning of the long-period learning value FLLAF does not occur yet. The fuel amount determiner 61 reads the real time learning value FRLAF corresponding to the running state at that point of time, from the real time learning value map 74 in which the real time learning value FRLAF was updated and stored after the FB mode was executed previously, and sets the real time learning value FRLAF to the read value. Regardless of whether or not the ignition switch 51 is tuned ON/OFF before the FB mode is executed currently, the value can be read from the real time learning value map 74. Since the real time learning value FRLAF updated and stored in the FB mode executed at previous times is set just after the compensation using the running state compensation coefficient FO2RAM is performed, the air-fuel ratio can be made closer to the theoretical air-fuel ratio more quickly than a case where the FB mode was previously, in view of an individual difference between products.

As described above, among the three values FAF, FRLAF, and FLLAF, constituting the feedback compensation coefficient FFB, the values FRLAF and FLLAF (i.e., learning value FLAF) other than the closed-loop compensation value FAF works to make compensation in a period which passes from when the FB mode starts until the output of the $O_2$ sensor 56 changes first. In other words, these two values make compensation to enable the output of the $O_2$ sensor 56 to reach the changed value after the compensation using the running state compensation coefficient FO2RAM is performed. It is considered that this compensation is necessary due to the fact that there is an individual difference or degradation of the throttle devices 32 and the fuel feed devices 38. Hereinafter, a description will be given of a method of determining (deciding) the fuel feed amount associated with the compensation using the feedback compensation coefficient FFB, and in particular the learning value FLAF (i.e., the real time learning value FRLAF and the long-period learning value FLLAF), with reference to FIGS. 8 and 9.

Figure 8:
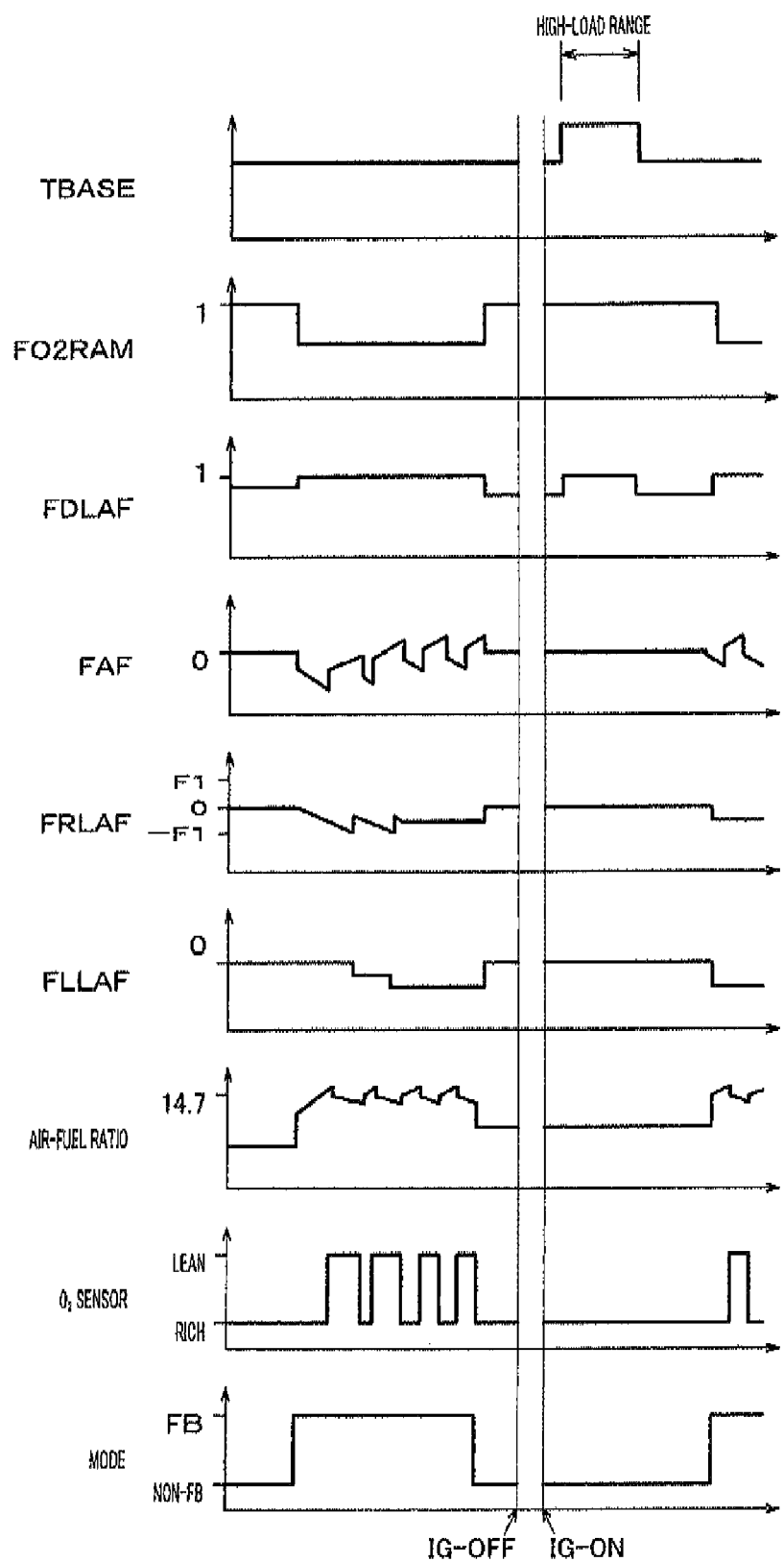
FIG. 8 is a timing chart showing an example of a method of determining (deciding) a fuel command value in the $O_2$ feedback control mode of FIG. 4, and an example of a method of determining (deciding) a fuel command value in the non-$O_2$ feedback control mode of FIG. 4.

FIG. 8 shows an example in which the FB mode and the non-FB mode are executed in a case where the motorcycle 1 has been used for a relatively long period of time and the degradation of its components has progressed over time (in addition, there is an individual difference between products). After such long-time use of the motorcycle 1, the intake valve 28, the throttle device 32, or the fuel injection device 38 may sometimes be degraded. In this case, even if the fuel command value TAU is determined (decided) based on the running state reference coefficient TBASE corresponding to the running state with reference to the running state reference coefficient map 71, the fuel may be fed with an amount different from the amount indicated by the fuel command value TAU, or an amount of air-intake assumed based on the throttle valve opening degree is not attained. As a result, a target air-fuel ratio assumed when the running state reference coefficient map 71 is created cannot be attained in some cases. This would not make the driving state of the motorcycle 1 unstable, but the driving power output characteristic of the engine 12 becomes slightly higher or lower than assumed, or the amount of HC and the amount of NOx in the exhaust gas become slightly greater than those assumed. If the amount of HC and the amount of NOx in the exhaust gas become greater, degradation of the catalyst in the ternary catalyst pipe 42 may progress at a higher pace. By comparison, the feedback compensation coefficient FFB makes compensation for suppressing negative effects attributed to the individual difference or degradation which has progressed over time to allow the air-fuel ratio to reach a value closer to the theoretical air-fuel ratio. To this end, in the non-FB mode of the present embodiment, even if the target air-fuel ratio assumed cannot be attained due to the degradation which has progressed over time, compensation is made for the running state reference coefficient TBASE, using a degradation learning compensation coefficient based on the value of the feedback compensation coefficient FFB set in the middle of the FB mode, to make compensation for a difference caused by the degradation.

For the sake of easier explanation, regarding the running range depicted in FIG. 8, zero is input to the real time learning value map 74 and the degradation learning compensation coefficient map 75 as the values corresponding to this running range, because of the fact that an opportunity for learning for the real time learning value FRLAF and the long-period learning value FFLAF does not occur yet at a start point of the timing chart of FIG. 8.

When the FB mode starts under such a circumstance, compensation is made for the running state reference coefficient TBASE, by multiplying the running state reference coefficient TBASE by the running state compensation coefficient FO2RAM, as described above. FIG. 8 shows an example in which the air-fuel ratio cannot be changed to a value closer to the theoretical air-fuel ratio, due to the degradation which has progressed over time, even after the compensation using the running state compensation coefficient FO2RAM is performed.

Just after the compensation using the running state compensation coefficient FO2RAM is performed, the values read from the real time learning value map 74 and the long-period learning value map 75 are zero, and therefore, three values constituting the feedback compensation coefficient FFB are zero. Thereafter, the closed-loop compensation value FAF changes from increasing to decreasing or from decreasing to increasing every time the output of the $O_2$ sensor 56 is inverted, as described above. In the example shown in FIG. 8, the output of the $O_2$ sensor 56 indicates the rich air-fuel ratio, just after compensation using the running state compensation coefficient FO2RAM is performed. Because of this, the real time learning value FRLAF is decreased gradually until the skip value of the closed-loop compensation value FAF has crossed a reference value.

When the real time learning value FRLAF decreases to a threshold F1, the long-period learning value FLLAF is added with a predetermined value (negative), while the real time learning value FRLAF changes to a value derived by subtracting this predetermined value (negative) from its current value (zero). In this way, every time the real time learning value FRLAF reaches the threshold, the predetermined value is subtracted from the current value of the real time learning value FRLAF and the long-period learning value FLLAF is added with the predetermined value concurrently with this subtraction (see a trend of the real time learning value FRLAF and a trend of the long-period learning value FLLAF in FIG. 8). To be specific, until the skip value of the closed-loop compensation value FAF has crossed the reference value, the real time learning value FRLAF continues to be changed, and hence the whole learning value FLAF continues to be changed, in such a manner that an increase of the real time learning value FRLAF is shifted to the long-period learning value FLLAF every time the real time learning value FRLAF reaches the threshold. When the skip value of the closed-loop compensation value FAF has crossed the reference value, it is increased or decreased thereafter in the same manner, while monitoring the output of the $O_2$ sensor 56. Thus, the air-fuel ratio can be stabilized at a value closer to the theoretical air-fuel ratio.

When the FB mode terminates, the real time learning value FRLAF is updated and stored in the memory 63 as described above. The learning value calculator 64 still uses the long-period learning value FLLAF as the degradation learning compensation coefficient. The long-period learning value FLLAF as the degradation learning compensation coefficient is updated and stored in the memory 63. When the running state changes in the middle of the FB mode, the value set just before the running state changes is stored for each running state in the memory 63, and the value set just before the FB mode terminates is stored for each running state.

When the FB mode starts at a next time and the following time, the real time learning value FRLAF and the long-period learning value FLLAF are read from the memory 63. Thus, when the FB mode starts at a next time and the following time, the closed-loop control is executed while monitoring the output of the O₂ sensor 56, in view of the compensation performed for the degradation, just after the start of the FB mode.

Figure 9:
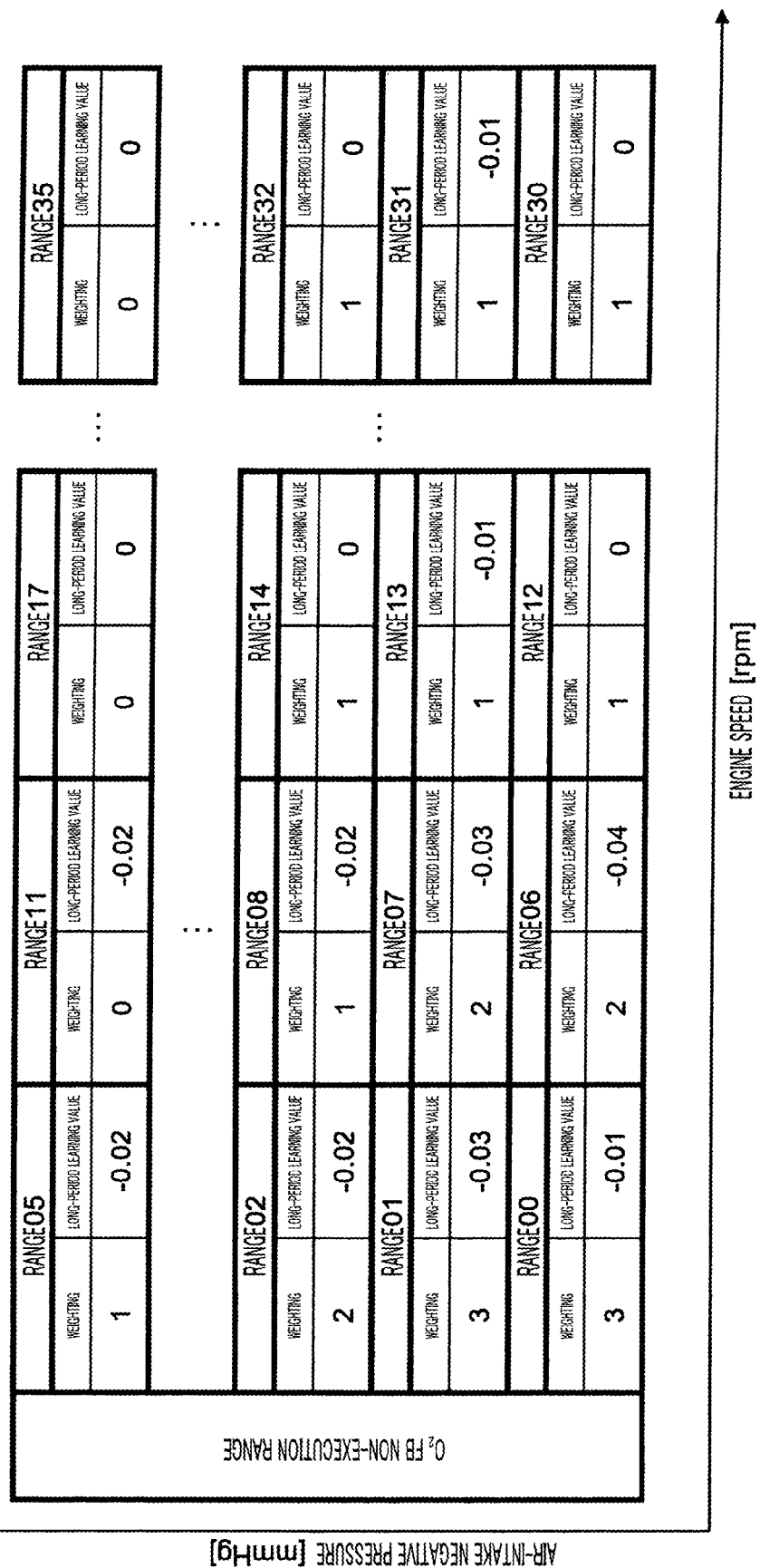
FIG. 9 is a schematic view of a long-period learning value map stored in the memory of FIG. 3.

FIG. 9 is a schematic view of the long-period learning value map 75 stored in the memory 63. As described above, the long-period learning value FLLAF as the degradation learning compensation coefficient is updated and stored in the memory 63 for each running state. To be specific, the memory 63 stores as the long-period learning value map 75, a correspondence between the long-period learning values FLLAF and the running ranges each of which is defined by the engine speed and the air-intake negative pressure (or throttle valve opening degree) such that the long-period learning values FLLAF respectively correspond to the running ranges. The number of the running ranges is not limited to that depicted in FIG. 9, but may be changed suitably. The memory 63 is configured to preserve the long-period learning value map 75 even after the ignition switch 51 is turned OFF.

When the FB mode terminates and the long-period learning value map 75 is updated and stored in the memory 63, the learning value calculator 64 calculates a representative value of the degradation learning compensation coefficients, based on the long-period learning values as the degradation learning compensation coefficients, and stores the representative value in the memory 63.

$$FDLAF = 1 + \{FLLAF(00) \times w(00) + FLLAF(01) \times w(01) + \ldots + FLLAF(35) \times w(35)\} / \{w(00) + w(01) + \ldots + w(35)\} \quad (6)$$

FDLAF is the representative value of the degradation learning compensation coefficients, FLLAF (i) is a long-period learning value (degradation learning compensation coefficient) associated with a range i (i=00~35 in the example of FIG. 9), and w(i) is a weight coefficient associated with the range i.

As can be seen from the formula (6), the representative value FDLAF of the degradation learning compensation coefficients is a value derived by addition of 1 and a weighted average (mean) of a plurality of long-period learning values FLLAF (01), FLLAF (02), . . . corresponding to the running ranges, respectively. In a case where the motorcycle 1 has been used for a relatively short period of time, and the long-period learning value FLLAF corresponding to any one of the running ranges is not updated and stored in the memory 63, a term of the weighted average in the formula (6) is zero, and therefore the representative value FDLAF is 1. In this case, as indicated by the formula (3), even in the non-FB mode, compensation using the degradation learning compensation coefficient is disenabled On the other hand, in a case where the motorcycle 1 has been used for a relatively long period of time, and the long-period learning values FLLAF corresponding to the running ranges are stored in the long-period learning value map 75 of FIG. 9, the representative value FDLAF may be set to a value different from 1. In this case, in the non-FB mode, compensation using the degradation learning compensation coefficient is enabled.

Note that the weight coefficient w(i) may be set to a greater value when the engine speed is lower and when the air-intake negative pressure or the throttle valve opening degree is smaller. This makes it possible to improve sensitivity of compensation of the fuel amount and to perform compensation for suppressing negative effects attributed to the degradation more correctly, when the air amount is less.

The weight coefficients w(i) are set in such a manner that the weight coefficient w(i) corresponding to a running range within the FB mode which is near a running range in the non-FB mode which enables compensation for the degradation is set greater. This makes it possible to execute control effectively using degradation information of similar running ranges. For example, in a vehicle which is in the non-FB mode when the engine is in a low load range, a weight coefficient w(i) corresponding to a low load range within the FB mode may be set to a greater value.

The representative value is calculated every time the FB mode terminates. If the long-period learning value map 75 continues to be preserved after the ignition switch 51 is turned OFF, the representative value may be erased from the memory 63 when the ignition switch 51 is turned OFF. In that case, the representative value is calculated with reference to the preserved long-period learning value map 75 just after the ignition switch 51 is turned ON.

FIG. 8 illustrates a case where the air-fuel ratio shifts to the rich air-fuel ratio due to the degradation, and thereby the degradation learning compensation coefficient becomes smaller than 1. On the other hand, in a case where the air-fuel ratio shifts to the lean air-fuel ratio due to the degradation, the long-period learning value becomes a positive value, and thereby the representative value of the degradation learning compensation coefficient becomes greater than 1. Thus, in accordance with the air-fuel ratio control system of the present embodiment, regardless of whether the air-fuel ratio shifts to the rich air-fuel ratio or to the lean air-fuel ratio due to the degradation, the air-fuel ratio can be maintained at a target value correspondingly.

Referring to FIG. 8, when the control mode shifts from the FB mode to the non-FB mode, the running state reference coefficient TBASE and the environment compensation coefficient FKI corresponding to the running state at that point of time are selected, and the degradation learning compensation coefficient is read from the memory 63. And, the fuel command value TAU is determined (decided) by making compensation for the running state reference coefficient TBASE using the environment compensation coefficient FKI and the representative value, according to the formula (3).

As described above, the long-period learning value FLLAF is used as the degradation learning compensation coefficient without altering it, and serves to make compensation to suppress negative effects attributed to the degradation to make the air-fuel ratio closer to the theoretical air-fuel ratio. Therefore, even in a case where a target air-fuel ratio assumed when the running state reference coefficient map 71 is created cannot be attained, due to the degradation, even though the fuel command value TAU is determined (decided) based on the running state reference coefficient TBASE selected from the running state reference coefficient map 71, the fuel command value TAU is determined (decided) by making compensation for the running state reference coefficient TBASE using the degradation learning compensation coefficient. Thus, the degradation can be addressed, and a target air-fuel ratio can be achieved. Therefore, even after the long-time use of the motorcycle 1, it is possible to effectively prevent the driving power output characteristic of the engine 12 from being deviated from a driving power output characteristic assumed. In addition, it is possible to effectively prevent the HC amount and the NOx amount in the exhaust gas from being deviated from assumed amounts. As a result, a life of the catalyst in the ternary catalyst pipe 42 can be made longer.

As described above, the representative value of the degradation learning compensation coefficients is calculated based on the weighted average (mean) of a plurality of degradation learning compensation coefficients respectively corresponding to the running ranges. Since the degradation learning compensation coefficients are set to correspond to the running ranges, respectively, it is possible to address a situation in which there is a difference in degree of negative effects attributed to degradation, between the running ranges. Under this condition, weighted average is used. Therefore, even when a particular running range in which the FB mode is less likely to be executed is selected in the non-FB mode, a degradation learning compensation coefficient which reflects a novel long-period learning value attained in another running range can be used to determine a fuel command value TAU corresponding to the particular running range in the non-FB mode.

The degradation learning compensation coefficient is calculated based on only a part of the learning values FLAF constituting the feedback compensation coefficient FFB. In other words, in calculation of the degradation learning compensation coefficient, a dead band is provided. Because of the presence of the dead band, degradation learning compensation coefficient can be suppressed effectively from being affected by an abrupt fluctuation in the feedback compensation coefficient FFB in the middle of the FB mode. As shown in FIG. 8, when the running state is in a high-load range in the non-feedback control mode, compensation using the degradation learning compensation coefficient may be disenabled.

To merely provide the dead band, the feedback compensation coefficient FFB may be composed of two values which are the closed-loop compensation coefficient FAF and the learning value FLAF, and a value derived by multiplying the learning value FLAF in the FB mode by a ratio less than 1, or a value derived by subtracting a predetermined value from the learning value FLAF, may be updated and stored as the degradation learning compensation coefficient.

In the present embodiment, such a method is not used. Instead, to implement control in the present embodiment, the learning value FLAF is composed of two values which are the real time learning value FRLAF and the long-period learning value FLLAF, and an increase in the real time learning value FRLAF is shifted to the long-period learning value FLLAF, in the whole learning value FLAF. Thereby, a portion functioning as the dead band can be stored as data in the memory 63 as described above. This makes it possible to determine the fuel command value TAU using data (real time learning value FRLAF) read in the FB mode at a next time and the following time as described above. As a result, the air-fuel ratio can be made closer to the theoretical air-fuel ratio quickly.

Since the memory 63 is configured to preserve the long-period learning value map 75 even after the ignition switch 51 is turned OFF, compensation using the degradation learning compensation coefficient or the representative value can be enabled from when the non-FB mode is initiated just after the ignition switch 51 is turned ON.

Next, a method of determining (deciding) a fuel feed amount in the idle mode will be described. In the present embodiment, in the idle mode, the first determiner 81 and the second determiner 82 in the combustion state determiner 65 determine whether or not the combustion state is stable, by different methods.

Figure 10:
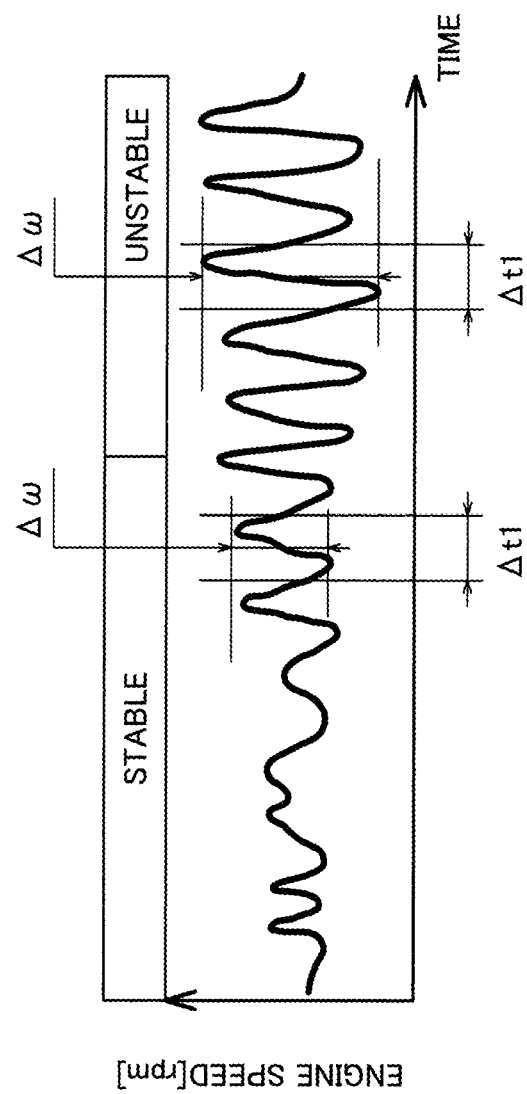
FIG. 10 is a view showing a process for determining whether or not a combustion state of an engine is stable, which process is performed by a first determiner in a combustion state determiner of FIG. 3.

FIG. 10 is a view showing a process for determining whether or not the combustion state is stable, which process is performed by the first determiner 81. In FIG. 10, a horizontal axis indicates a time and a vertical axis indicates an engine speed. In the idle mode, the first determiner 81 continues to obtain an instant value of the engine speed for a passage of a predetermined time $\Delta t1$, extracts a minimum value and a maximum value from among the values attained, at a time point of the passage of the predetermined time $\Delta t1$, and calculates a deviation $\Delta \omega$ between the minimum value and the maximum value. Then, the first determiner 81 determines whether or not the deviation $\Delta w$ is not less than a threshold. The predetermined time $\Delta t1$ is set to a time period which is long enough to enable the four-stroke engine 12 to finish running in one or more cycles, i.e., a time period which is long enough to monitor a behavior of a multi-cylinder engine macroscopically, in a situation in which it is determined that the running state is in the idle range.

If it is determined that the deviation $\Delta \omega$ is less than the threshold, i.e., the behavior of the engine speed is stabilized, the first determiner 81 determines that the combustion state is stable. On the other hand, if it is determined that the deviation $\Delta \omega$ is not less than the threshold, i.e., the behavior of the engine fluctuates significantly, the first determiner 81 determines that the combustion state is unstable.

Figure 11A:
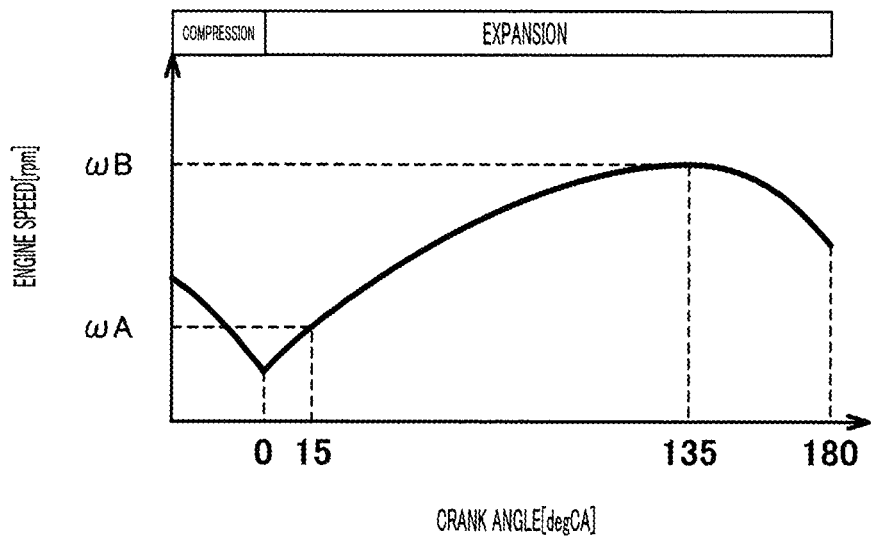
FIG. 11A is a view showing a process for determining whether or not the combustion state of the engine is stable, which process is performed by a second determiner in the combustion state determiner of FIG. 3, and showing a typical example in which the combustion state is stable.
Figure 11B:
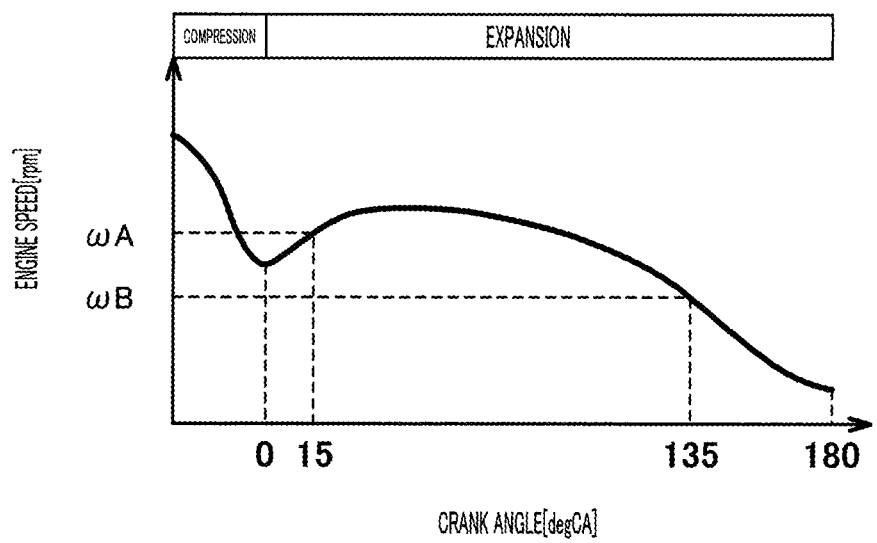
FIG. 11B is a view showing a process for determining whether or not the combustion state of the engine is stable, which process is performed by the second determiner in the combustion state determiner of FIG. 3, and showing a typical example in which the combustion state is unstable.

FIGS. 11A and 11B show a method of determining whether or not the combustion state is stable, which process is performed by the second determiner 82. FIG. 11A shows a typical example in which the combustion state is stable. FIG. 11B shows a typical example in which the combustion state is unstable. In FIGS. 11A and 11B, a horizontal axis indicates a crank angle and a vertical axis indicates an engine speed.

The second determiner 82 calculates a difference value between a first engine speed $\omega A$ attained at a crank angle (e.g., 15 degrees) near the start of an expansion stroke in each cylinder and a second engine speed $\omega B$ attained at a crank angle (e.g., 135 degrees) near the end of the expansion stroke in each cylinder. The second determiner 82 calculates the difference value by subtracting the first engine speed $\omega A$ from the second engine speed $\omega B$. The second determiner 82 calculates the difference value in each cycle until a passage of cycles of a predetermined number. Then, the second determiner 82 extracts a maximum value and a minimum value from among the calculated difference values of the predetermined number. The second determiner 82 calculates a deviation change coefficient by a smoothing process for dividing a deviation between the extracted maximum value and minimum value by a filter factor.

Referring to FIG. 11A, when normal combustion is performed, the engine speed increases so as to draw a curve which protrudes upward from the start of an expansion stroke until near the end of the expansion stroke, and therefore the above difference value is a relatively great positive value during this period of time. When such combustion continues, the deviation change coefficient is a relatively great positive value. Referring to FIG. 11B, if a weak fire or a misfire occurs, the engine speed does not rise significantly in a period from the start of an expansion stroke until near the end of the expansion stroke. In extreme cases, as shown in FIG. 11B, the engine speed decreases. In this case, the above difference value is a positive value which is near zero, and is a negative value in extreme cases. If such combustion continues, the deviation change coefficient is a positive value near zero or a value which is not greater than zero.

The second determiner 82 determines whether or not a deviation change coefficient corresponding to a particular cylinder is not less than a threshold. The threshold is set to a positive value. If it is determined that the deviation change coefficient is not less than the threshold, the second determiner 82 determines that combustion of the cylinder is stable. On the other hand, if it is determined that the deviation change coefficient is less than the threshold, the second determiner 82 determines that combustion of the cylinder is unstable.

Figure 12:
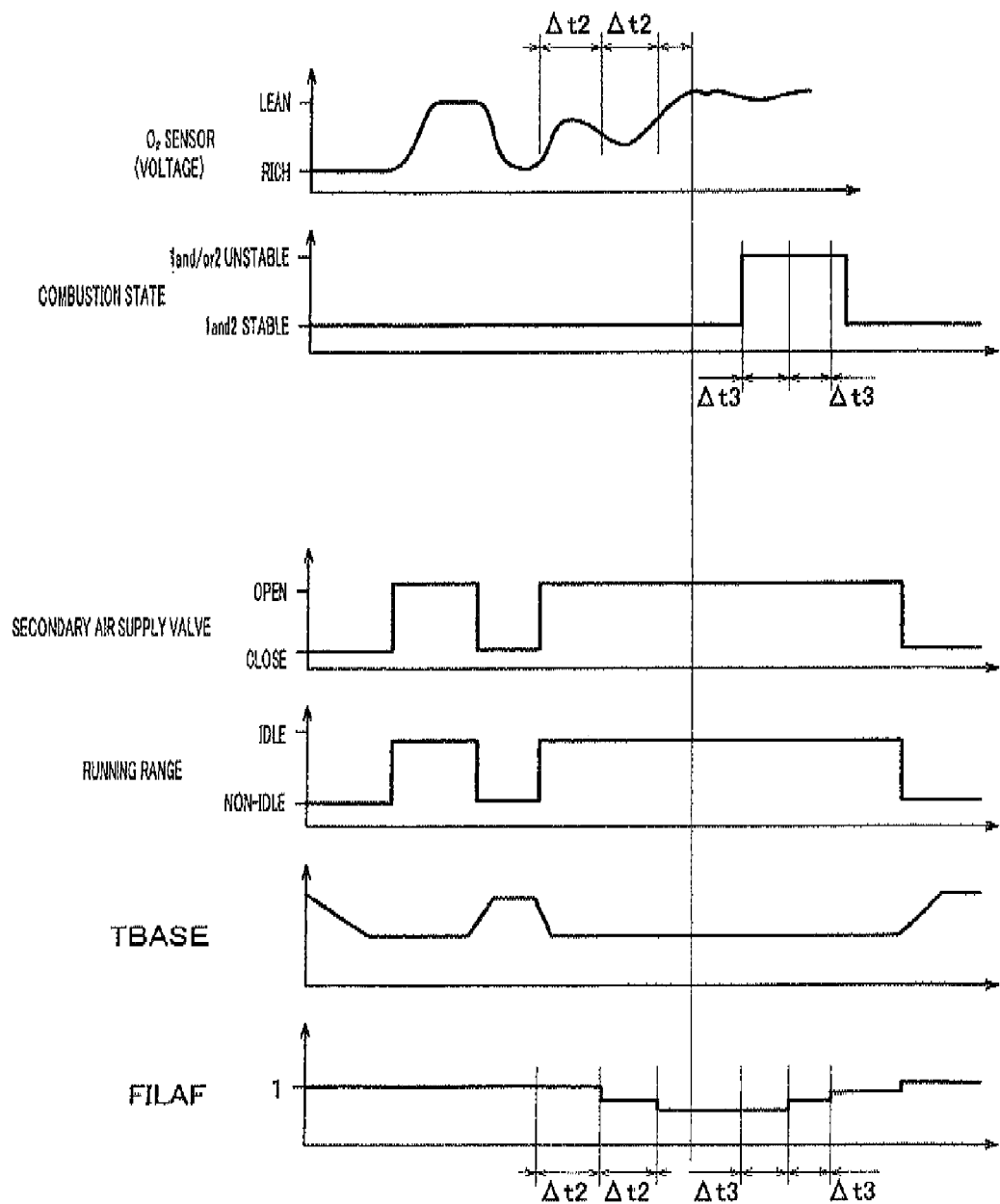
FIG. 12 is a timing chart showing an example of a method of determining (deciding) a fuel command value in an idle mode of FIG. 4.

FIG. 12 is a timing chart showing an example of a method of determining (deciding) a fuel command value TAU in the idle mode. Referring to FIG. 12, when the running state is in the idle range, the secondary air controller 91 causes the secondary air supply valve 47 to open the secondary air supply pipe 46. Concurrently, the first determiner 81 and the second determiner 82 start to determine whether or not the combustion state is stable.

The fuel amount determiner 61 extracts a running state reference coefficient TBASE corresponding to the idle range from the running state reference coefficient map 71 and reads an idle compensation coefficient FILAF from the memory 63. The fuel amount determiner 61 determines (decides) the fuel command value TAU in such a manner that compensation is made for the running state reference coefficient TBASE using the idle compensation coefficient FILAF according to the formula (4). In the example of FIG. 12, it is supposed that 1 is initially stored in the memory 63 as the value of the idle compensation coefficient FILAF.

The fuel amount determiner 61 monitors whether the output of the $O_2$ sensor 56 indicates that the air-fuel ratio of the air-fuel mixture including the secondary air is a rich air-fuel ratio or a lean air-fuel ratio. That is, the fuel amount determiner 61 determines whether or not a predetermined time $\Delta t2$ has passed after the idle mode is initiated. If the output of the $O_2$ sensor 56 changes to a value indicating the lean air-fuel ratio, before a passage of the predetermined time period $\Delta t2$, the idle mode continues without making compensation for the idle compensation coefficient FILAF. If the output of the $O_2$ sensor 56 changes to a value indicating the lean air-fuel ratio and then changes to a value indicating the rich air-fuel ratio, even in the middle of the idle mode, the fuel amount determiner 61 determines whether or not the output of the $O_2$ sensor 56 changes to a value indicating the lean air-fuel ratio, in a period from when the output of the $O_2$ sensor 56 has changed to a value indicating the rich air-fuel ratio until the predetermined time $\Delta t2$ has passed, in the same manner.

If it is determined that the output of the $O_2$ sensor 56 has not changed to a value indicating the lean air-fuel ratio, within the predetermined time $\Delta t2$, the fuel amount determiner 61 makes compensation for the idle compensation coefficient FILAF such that the idle compensation coefficient FILAF is decreased by a predetermined amount. After performing this compensation, the fuel amount determiner 61 determines whether or not the output of the $O_2$ sensor 56 changes to a value indicating the lean air-fuel ratio, within the predetermined time $\Delta t2$, again. The fuel amount determiner 61 performs such a process while monitoring the output of the $O_2$ sensor 56, and decreases the idle compensation coefficient FILAF by the predetermined amount every passage of the predetermined time $\Delta t2$, until the output of the $O_2$ sensor 56 changes to a value indicating the lean air-fuel ratio. This makes it possible to effectively suppress the air-fuel ratio of the air-fuel mixture including the secondary air from becoming an excess-rich air-fuel ratio, due to the degradation of the components, in the idle range. The compensation for decreasing the idle compensation coefficient FILAF is carried out for only a cylinder for which it is determined that the combustion state is stable.

The compensation for decreasing the idle compensation coefficient FILAF might sometimes result in a weak fire or a misfire. Accordingly, if the combustion state determiner 65 determines that the combustion state is unstable, the fuel amount determiner 61 diminishes the degradation coefficient FBLAF (idle compensation coefficient FILAF) such that the idle compensation coefficient FILAF is increased by a predetermined amount, every passage of a predetermined time $\Delta t3$, until it is determined that the combustion state is stable. If the first determiner 81 determines that the combustion state is unstable, compensation for diminishing the idle compensation coefficient FILAF is performed for the idle compensation coefficients FILAF corresponding to all the cylinders together, because the first determiner 81 performs the determination macroscopically. If the second determiner 82 determines that the combustion state is unstable, compensation for diminishing the idle compensation coefficient FILAF is performed only for the idle compensation coefficient FILAF corresponding to a cylinder for which it is determined that the combustion state is unstable, because the second determiner 82 determines whether or not the combustion state in the expansion stroke of each cylinder is stable. The compensation for diminishing the idle compensation coefficient FILAF makes it possible to effectively prevent compensation using the degradation coefficient FBLAF (idle compensation coefficient FILAF) from being performed to an excess level. Note that the compensation for diminishing the idle compensation coefficient FILAF is performed in such a manner that once the idle compensation coefficient FILAF reaches an initial value (1 in the example of FIG. 12) set as the value of the idle compensation coefficient FILAF, the value of the idle compensation coefficient FILAF is not increased any more. This makes it possible to effectively prevent the air-fuel ratio of the air-fuel mixture including the secondary air from becoming the rich air-fuel ratio.

Figure 13:
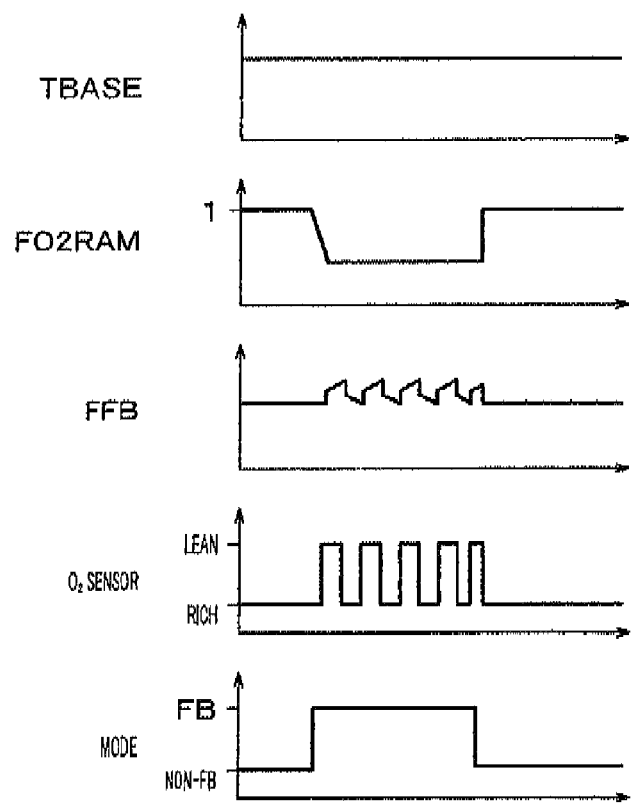
FIG. 13 is a timing chart showing a modified example of a method of setting a running state compensation coefficient just after the $O_2$ feedback control mode of FIG. 4 is started.

FIG. 13 is a timing chart showing a modified example of a method of setting a running state compensation coefficient FO2RAM just after the FB mode is started. Referring to FIG. 13, when the control mode shifts from the non-FB mode to the FB mode, the running state reference coefficient TBASE is selected from the running state reference coefficient map 71, and the running state compensation coefficient FO2RAM is selected from the running state compensation coefficient map 73 based on the running state at that point of time. After that, the running state compensation coefficient FO2RAM may be changed gradually from the value (1 in the example of FIG. 12) set in the non-FB mode to the selected value. The running state compensation coefficient FO2RAM may be changed gradually by a method such as a filtering process which does not permit a change exceeding a predetermined change rate, a first-order lag process, etc. Before the running state compensation coefficient FO2RAM reaches the selected value, the feedback compensation coefficient FFB may be maintained at the value set in the non-FB mode, and the real time learning value FRLAF and the long-period learning value FLLAF may be set to the values read from the memory 63 at a time point when the running state compensation coefficient FO2RAM reaches the selected value.

This makes it possible to suppress a fuel feed amount from changing rapidly and thereby the engine driving power from changing rapidly, when the control mode shifts. In this case, a change rate of the running state compensation coefficient FO2RAM is preferably greater than a change rate of the real time learning value FRLAF. This makes it possible to suppress the engine driving power from changing rapidly and to change the air-fuel ratio into a value closer to the theoretical air-fuel ratio quickly.

Figure 14:
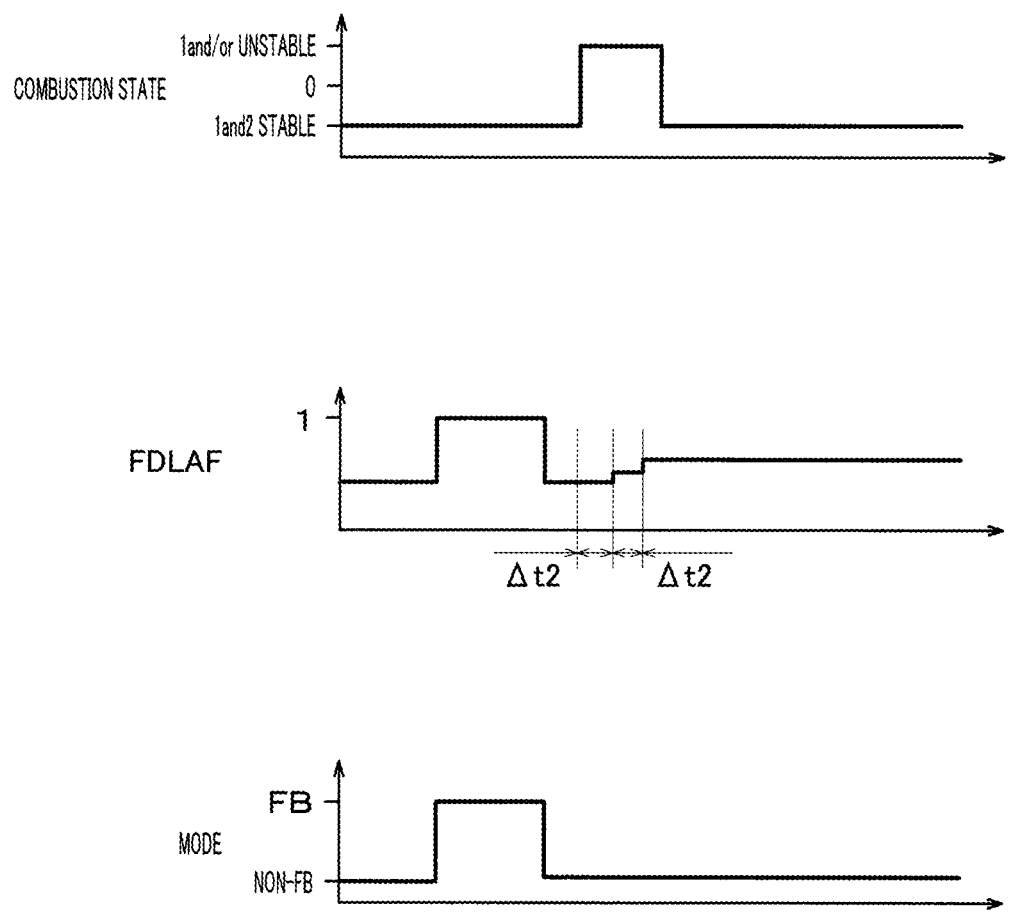
FIG. 14 is a timing chart showing a modified example of a method of determining (deciding) the fuel command value in the $O_2$ feedback control mode of FIG. 4.

FIG. 14 is a timing chart showing a modified example of a method of determining (deciding) the fuel command value in the non-FB mode. As shown in FIG. 14, the compensation for diminishing the degradation coefficient in the case where the combustion state is unstable may be performed in the non-FB mode in addition to the idle mode. In the non-FB mode, the compensation for diminishing the degradation coefficient FBLAF (i.e., degradation learning compensation coefficient or its representative value FDLAF) is performed in such a manner that the degradation learning compensation coefficient assigned to the degradation coefficient FBLAF or its representative value FDLAF is increased by a predetermined value so that it gets closer to the initial value (i.e., 1). Note that in the non-FB mode, if the air-fuel ratio shifts to the lean air-fuel ratio due to degradation of the components, the degradation learning compensation coefficient or its representative value FDLAF is set to a value greater than the initial value. In this case, if it is determined that the combustion state is unstable, the compensation for diminishing the degradation learning compensation coefficient or its representative value FDLAF is performed in such a manner that the degradation learning compensation coefficient or its representative value FDLAF is decreased by a predetermined amount so that it gets closer to the initial value. This makes it possible to effectively prevent compensation using the degradation coefficient FBLAF from being performed to an excess level.

FIG. 15 is a schematic view of a running state compensation fuel amount map 173 as a modified example of the running state compensation coefficient map 73. As can be seen from a comparison between FIG. 15 and FIGS. 5A and 5B, the running state compensation fuel amount map 173 contains values derived by multiplying the running state reference coefficients TBASE of FIG. 5A by the running state compensation coefficients FO2RAM of FIG. 5B such that the running state compensation coefficients FO2RAM correspond to running states, respectively. When the running state compensation fuel amount map 173 is stored instead of the running state compensation coefficient map 73, the fuel amount determiner 61 determines (decides) the fuel command value TAU according to the following formula (7) instead of the formulas (1) and (2).

$$TAU = TO2RAM \times (1 + FKI + FFB) \quad (7)$$

TO2RAM is a running state compensation fuel amount and is a value derived by multiplying the running state reference coefficient TBASE of FIG. 5A by the running state compensation coefficient FO2RAM of FIG. 5B. When the control mode shifts from the non-FB mode to the FB mode, the fuel amount determiner 61 switches a map to be referred, from the running state reference coefficient map 71 to the running state compensation fuel amount map 173 for deriving the running state compensation fuel amount resulting from compensation using the running state compensation coefficient FO2RAM (i.e., air-excess ratio).

Thus far, the embodiment of the present invention has been described. The above described configuration and control method are merely exemplary, but may be suitably altered within the scope of the present invention.

Although in the present embodiment, the long-period learning value is used as the degradation learning compensation coefficient without altering it, a value of a degradation learning compensation coefficient different from a long-period learning value may be calculated for each running state based on the long-period learning value. Although the learning value calculator 64 calculates the representative value of the degradation learning compensation coefficients and calculates the fuel command value by using this representative value for all the running ranges except for the high-load range, it may calculate a fuel command value by applying the learning compensation coefficient calculated for each running state to the above formula (3) according to the running state. The degradation learning compensation coefficient or its representative value used in the non-FB mode may be used in the idle mode.

Although in the present embodiment, the fuel command value TAU used in the FB mode is determined (decided) according to the formula (2), the present invention is not limited to this, and another formula may be used so long as it substantially includes a running state reference coefficient pre-stored, a running state compensation coefficient pre-stored, and a feedback compensation coefficient varying sequentially.

For example, in addition to multiplication of the respective coefficients, a value derived by adding the running state compensation coefficient FO2RAM to the feedback compensation coefficient FFB may be multiplied by the running state reference coefficient TBASE. In addition, the coefficients may be added together. Although the running state reference coefficient TBASE and the environment compensation coefficient FKI are used separately in the present embodiment, a coefficient including the running state reference coefficient TBASE and the environment compensation coefficient FKI may be used as the running state reference coefficient. Moreover, the environment compensation coefficient FKI may not be used.

The above change in the feedback compensation coefficient FFB which occurs over time described in the present embodiment is merely exemplary, and another time change may occur so long as the compensation coefficients change to allow the air-fuel ratio to reach a value closer to the theoretical air-fuel ratio over time. For example, a single value which is a combination of the real time learning value FRLAF and the long-period learning value FLLAF may be used, or a single value which is a combination of the closed-loop compensation value FAF, the real time learning value FRLAF and the long-period learning value FLLAF may be used. Although in the present embodiment, the learning value used in the FB mode is reflected in the non-FB mode, the present invention is not limited this, and the operation in the FB mode alone may be within the scope of the present invention.

Although in the present embodiment, the running state reference coefficients TBASE, the environment compensation coefficients FKI, and the running state compensation coefficients FO2RAM are pre-stored in the memory 63 in the form of maps, formulas for deriving the respective coefficients based on the running states may be stored thereon. The fuel amount determiner 61 may be implemented as software by executing a program stored in the memory 63, or as hardware using an electric circuit.

Although in the present embodiment, the fuel injection device 38 is used as means for adjusting the air-fuel ratio, air-fuel ratio control of an internal combustion engine may be performed using another air-fuel ratio adjusting means capable of feedback control. For example, an air supply amount may be controlled, in addition to or instead of the fuel feed amount. For example, the air-fuel ratio may be controlled by controlling the opening degree of the sub-throttle valve by the throttle controller, along with the control of the fuel feed amount. Although in the present embodiment, the air-fuel ratio control is executed in view of the determined degradation which has progressed over time, the air-fuel ratio control system may be used merely as a system for determining a rate of degradation which has progressed over time rather than the system for performing the air-fuel ratio control. For example, by displaying the rate of degradation which has progressed over time, the user can be informed of a changed time, for example, when the motorcycle is inspected.

The present invention is suitably applied to high-rotational-speed vehicles and low-load vehicles like motorcycles among vehicles including internal combustion engines. Also, the present invention is suitably applied to small lightweight vehicles represented by straddle-type vehicles, or vehicles such as all terrain vehicles.

The present invention can reduce a time required to cause the air-fuel ratio to reach a value closer to the theoretical air-fuel ratio when the feedback control starts or a compensation amount required for the feedback control changes rapidly, thereby suppressing degradation of the quality of the exhaust gas, or suppressing the engine driving power from becoming lower than a desired one. The present invention is advantageously applied to the straddle-type vehicles such as motorcycles.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An air-fuel ratio control system of an internal combustion engine comprising:
   a running state detector for detecting a running state of the internal combustion engine;
   an air-fuel ratio sensor which changes an output characteristic thereof when an air-fuel ratio of exhaust gas becomes closer to a theoretical air-fuel ratio;
   a fuel feed device for feeding fuel to the internal combustion engine such that a fuel feed amount is adjustable;
   a fuel amount determiner for determining a fuel command value indicating the fuel feed amount of the fuel to be fed by the fuel feed device; and
   a memory for storing a first correspondence between running state reference coefficients and running states of the internal combustion engine, and a second correspondence between running state compensation coefficients and the running states, the running state reference coefficients indicating reference fuel feed amounts required to obtain target air-fuel ratios set as corresponding to the running states, respectively such that the target air-fuel ratios are different from each other and include values which are other than the theoretical air-fuel ratio; the running state compensation coefficients indicating values obtained by dividing the target air-fuel ratios corresponding to the reference fuel feed amounts by the theoretical air-fuel ratio;
   wherein the fuel amount determiner has a feedback control mode in which the fuel amount determiner determines the fuel command value based on an output of the air-fuel ratio sensor, and a non-feedback control mode in which the fuel amount determiner determines the fuel command value irrespective of the output of the air-fuel ratio sensor,
   in the feedback control mode, the fuel amount determiner determines a running state reference coefficient corresponding to the running state detected by the running state detector based on the first correspondence stored in the memory, determines a running state compensation coefficient corresponding to the running state detected by the running state detector based on the second correspondence stored in the memory, determines a feedback compensation coefficient used to cause the air-fuel ratio to reach a value closer to the theoretical air-fuel ratio based on an output of the air-fuel ratio sensor, and determines the fuel command value using a first formula including the determined running state reference coefficient, the determined running state compensation coefficient, and the determined feedback compensation coefficient, the air-fuel ratio control system further comprising:
   a learning value calculator for calculating a degradation learning compensation coefficient used to suppress a negative effect of degradation of the internal combustion engine which has progressed over time, based on the feedback compensation coefficient determined in the feedback control mode;
   wherein the memory updates and stores the degradation learning compensation coefficient, and
   in the non-feedback control mode, the fuel amount determiner determines the running state reference coefficient corresponding to the running state detected by the running state detector based on the first correspondence stored in the memory, reads the degradation learning compensation coefficient stored in the memory, and determines the fuel command value using a second formula including the determined running state reference coefficient and the read degradation learning compensation coefficient.

2. The air-fuel ratio control system according to claim 1, wherein the learning value calculator calculates degradation learning compensation coefficients for the running states, respectively; and
   the memory stores a third correspondence between the running states and the degradation learning compensation coefficients, for each of the running states.

3. The air-fuel ratio control system according to claim 2, wherein the learning value calculator calculates a weighted average derived by weighting a plurality of degradation learning compensation coefficients stored in the memory to respectively correspond to the running states, and calculates a representative value of the degradation learning compensation coefficients based on the weighted average;
   the memory updates and stores the representative value calculated by the learning value calculator; and
   the fuel amount determiner calculates the fuel command value by applying the representative value to the second formula including the degradation learning compensation coefficient, in the non-feedback control mode.

4. The air-fuel ratio control system according to claim 1, wherein the feedback compensation coefficient includes a closed-loop compensation value, a real time learning value and a long-period learning value;
   the closed-loop compensation value is set to change to cause the air-fuel ratio to reach a value closer to the theoretical air-fuel ratio, and to change from increasing to decreasing or from decreasing to increasing every time the output of the air-fuel ratio sensor is inverted;
   the real time learning value is set to change to cause the air-fuel ratio to reach a value closer to the theoretical air-fuel ratio in a period during which the closed-loop compensation value does not cross a predetermined reference value, when the closed-loop compensation value changes from increasing to decreasing or from decreasing to increasing, and to maintain a value at a time point when the closed-loop compensation value crosses the predetermined reference value, when the closed-loop compensation value changes from increasing to decreasing or from decreasing to increasing; and
   the long-period learning value is set to be added with a predetermined value and the real time learning value is set to be a value derived by subtracting the predetermined value from the real time learning value concurrently with the addition of the predetermined value to the long-period learning value, when the real time learning value reaches a predetermined threshold.

5. The air-fuel ratio control system according to claim 4, wherein the learning value calculator calculates the degradation learning compensation coefficient based on the long-period learning value.

6. The air-fuel ratio control system according to claim 1, wherein the memory is configured to preserve the degradation learning compensation coefficient in a state where an ignition switch of the internal combustion engine is OFF.

7. The air-fuel ratio control system according to claim 1, comprising:
a combustion state determiner for determining whether or not a combustion state of the internal combustion engine is unstable;
wherein the fuel amount determiner modifies the degradation learning compensation coefficient toward an initial value if the combustion state determiner determines that the combustion state is unstable.

8. The air-fuel ratio control system according to claim 1, comprising:
a combustion state determiner for determining whether or not a combustion state of the internal combustion engine is unstable;
wherein the fuel amount determiner has an idle mode in which the fuel amount determiner determines a running state reference coefficient corresponding to an idle range, and an idle compensation coefficient used to cause the output of the air-fuel ratio sensor to change to a value indicating a lean air-fuel ratio, and determines the fuel command value using a third formula including the determined running state reference coefficient and the determined idle compensation coefficient, when the running state detected by the running state detector is in the idle range;
and wherein the fuel amount determiner modifies the idle compensation coefficient toward an initial value when the combustion state determiner determines that the combustion state is unstable in the idle mode.

9. The air-fuel ratio control system according to claim 1, wherein the fuel amount determiner obtains a value of the running state compensation coefficient based on the running state detected by the running state detector, and changes the running state compensation coefficient to the obtained value over time, when the feedback control mode is started.

10. A method of controlling an air-fuel ratio of an internal combustion engine including a fuel feed device for feeding a fuel to the internal combustion engine such that a fuel feed amount is adjustable, the method comprising:
pre-storing a first correspondence between running state reference coefficients and running states of the internal combustion engine, and a second correspondence between running state compensation coefficients and the running states, the running state reference coefficients indicating reference fuel feed amounts required to obtain target air-fuel ratios set as corresponding to the running states, respectively, such that the target air-fuel ratios are different from each other and include values which are other than a theoretical air-fuel ratio; the running state compensation coefficients indicating values obtained by dividing the target air-fuel ratios corresponding to the reference fuel feed amounts by the theoretical air-fuel ratio;
executing a feedback control mode in which a fuel command value is determined based on an output of the air-fuel ratio sensor which changes an output characteristic thereof when an air-fuel ratio of exhaust gas is closer to the theoretical air-fuel ratio and a non-feedback control mode in which the fuel command value is determined irrespective of the output of the air-fuel ratio sensor;
in execution of the feedback control mode:
determining a running state reference coefficient corresponding to a running state detected by a running state detector based on the pre-stored first correspondence;
determining a running state compensation coefficient corresponding to the running state detected by the running state detector based on the pre-stored second correspondence;
determining a feedback compensation coefficient used to cause the air-fuel ratio to reach a value closer to the theoretical air-fuel ratio based on an output of the air-fuel ratio sensor;
determining a fuel command value indicating the fuel feed amount of the fuel to be fed by the fuel feed device using a first formula including the determined running state reference coefficient, the determined running state compensation coefficient, and the determined feedback compensation coefficient;
calculating a degradation learning compensation coefficient used to suppress a negative effect of degradation of the internal combustion engine which has progressed over time, based on the feedback compensation coefficient determined in the feedback control mode; and
updating and storing the degradation learning compensation coefficient; and
in the non-feedback control mode,
determining the running state reference coefficient corresponding to the running state detected by the running state detector based on the first correspondence stored in the memory, reading the degradation learning compensation coefficient stored in the memory, and determining the fuel command value using a second formula including the determined running state reference coefficient and the read degradation learning compensation coefficient.

11. The air-fuel ratio control system of the internal combustion engine according to claim 1,
wherein the memory is configured to store an environment compensation coefficient map which defines environment compensation coefficients used to make compensation for the running state reference coefficients, based on driving environments including a cooling water temperature and an air-intake pressure; and
wherein in the feedback control mode, the fuel amount determiner determines the environment compensation coefficient with reference to the environment compensation coefficient map, and the first formula includes the environment compensation coefficient.

12. The method of controlling the air-fuel ratio of the internal combustion engine according to claim 10, comprising:
in execution of the feedback control mode in a rich running state in which the target air-fuel ratio is set to a rich air-fuel ratio,
determining the fuel command value based on the running state reference coefficient set in the rich running state and the running state compensation coefficient set in the rich running state and injecting the fuel with the determined fuel command value; and
making compensation for the fuel command value using a feedback compensation coefficient determined based on the output of the air-fuel ratio sensor, after determining the fuel amount command value and injecting the fuel.

* * * * *